US012489254B2

(12) United States Patent
Song et al.

(10) Patent No.: US 12,489,254 B2
(45) Date of Patent: Dec. 2, 2025

(54) BACKPLANE CONNECTOR WITH IMPROVED METAL SHIELD SURROUNDING MEMBER

(71) Applicant: DONGGUAN LUXSHARE TECHNOLOGIES CO., LTD, Dongguan (CN)

(72) Inventors: Tao Song, Dongguan (CN); Kun Liu, Dongguan (CN); Xiaoping Wu, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 296 days.

(21) Appl. No.: 18/231,987

(22) Filed: Aug. 9, 2023

(65) Prior Publication Data

US 2023/0387635 A1 Nov. 30, 2023

Related U.S. Application Data

(63) Continuation-in-part of application No. 17/341,129, filed on Jun. 7, 2021, now Pat. No. 11,769,968.

(30) Foreign Application Priority Data

Jun. 19, 2020 (CN) ......................... 202010567796.4
Aug. 17, 2020 (CN) ......................... 202021709484.4

(51) Int. Cl.
*H01R 13/6587* (2011.01)
*H01R 12/73* (2011.01)
(Continued)

(52) U.S. Cl.
CPC ....... *H01R 13/6587* (2013.01); *H01R 12/737* (2013.01); *H01R 13/514* (2013.01); *H01R 13/518* (2013.01)

(58) Field of Classification Search
CPC ................................................. H01R 13/6471
(Continued)

(56) References Cited

U.S. PATENT DOCUMENTS 4,601,527 A 7/1986 Lemke
5,664,968 A 9/1997 Mickievicz
(Continued)

FOREIGN PATENT DOCUMENTS

CN 1244959 A 2/2000
CN 2513252 Y 9/2002
(Continued)

*Primary Examiner* — Phuong K Dinh
(74) *Attorney, Agent, or Firm* — Birch, Stewart, Kolasch & Birch, LLP

(57) ABSTRACT

A backplane connector includes a housing and a number of mounting modules. The housing includes a base defining a number of receiving grooves. The mounting modules are assembled to the receiving grooves. Each mounting module includes an insulating body, a terminal module installed in the insulating body, and a metal shield surrounding member sleeved on the insulating body. The metal shield surrounding member includes a surrounding portion and a mounting portion extending downwardly from the surrounding portion. The surrounding portion is formed by four side walls so as to form a fully-enclosed shielding cavity. As a result, the shielding effect and the grounding return effect of the backplane connector are improved.

20 Claims, 32 Drawing Sheets

(51) Int. Cl.
*H01R 13/514* (2006.01)
*H01R 13/518* (2006.01)

(58) Field of Classification Search
USPC ............................... 439/607.27, 607.08, 108
See application file for complete search history.

(56) References Cited

U.S. PATENT DOCUMENTS

| | | | | |
|---|---|---|---|---|
| 6,435,914 | B1 | 8/2002 | Billman | |
| 9,350,126 | B2 | 5/2016 | Little et al. | |
| 9,548,570 | B2 * | 1/2017 | Laurx | H01R 12/737 |
| 2004/0043658 | A1 | 3/2004 | Ko | |
| 2004/0229510 | A1 | 11/2004 | Lloyd et al. | |
| 2007/0155239 | A1 | 7/2007 | Nakada | |
| 2008/0014798 | A1 | 1/2008 | Pan | |
| 2013/0203273 | A1 | 8/2013 | Rathburn | |
| 2014/0051295 | A1 | 2/2014 | Westman et al. | |
| 2014/0248796 | A1 | 9/2014 | Pan | |
| 2014/0295705 | A1 | 10/2014 | Lee et al. | |
| 2015/0194771 | A1 | 7/2015 | Pan | |
| 2015/0244118 | A1 | 8/2015 | Lin et al. | |
| 2015/0303618 | A1 | 10/2015 | Lee et al. | |
| 2015/0318642 | A1 | 11/2015 | Lee et al. | |
| 2016/0028189 | A1 | 1/2016 | Resendez et al. | |
| 2016/0093985 | A1 | 3/2016 | Zhang et al. | |
| 2016/0322760 | A1 * | 11/2016 | Long | H01R 12/724 |
| 2018/0166828 | A1 | 6/2018 | Gailus | |
| 2019/0044284 | A1 * | 2/2019 | Dunham | H01R 13/6471 |
| 2021/0399492 | A1 | 12/2021 | Liu et al. | |
| 2021/0399498 | A1 | 12/2021 | Liu et al. | |

FOREIGN PATENT DOCUMENTS

| | | | |
|---|---|---|---|
| CN | 2571026 | Y | 9/2003 |
| CN | 1491465 | A | 4/2004 |
| CN | 1592990 | A | 3/2005 |
| CN | 2682605 | Y | 3/2005 |
| CN | 101159354 | A | 4/2008 |
| CN | 201142392 | Y | 10/2008 |
| CN | 101330172 | A | 12/2008 |
| CN | 101527409 | A | 9/2009 |
| CN | 101542640 | A | 9/2009 |
| CN | 101728667 | A | 6/2010 |
| CN | 101752700 | A | 6/2010 |
| CN | 101853996 | A | 10/2010 |
| CN | 101459299 | B | 11/2010 |
| CN | 102088148 | A | 6/2011 |
| CN | 102290653 | A | 12/2011 |
| CN | 102468562 | A | 5/2012 |
| CN | 202395246 | U | 8/2012 |
| CN | 102694308 | A | 9/2012 |
| CN | 102969621 | A | 3/2013 |
| CN | 103151650 | A | 6/2013 |
| CN | 103247918 | A | 8/2013 |
| CN | 103296546 | A | 9/2013 |
| CN | 103311746 | A | 9/2013 |
| CN | 203288874 | U | 11/2013 |
| CN | 103579835 | A | 2/2014 |
| CN | 203589266 | U | 5/2014 |
| CN | 103928795 | A | 7/2014 |
| CN | 103988371 | A | 8/2014 |
| CN | 203800269 | U | 8/2014 |
| CN | 104037551 | A | 9/2014 |
| CN | 104241975 | A | 12/2014 |
| CN | 104396095 | A | 3/2015 |
| CN | 104505678 | A | 4/2015 |
| CN | 104577406 | A | 4/2015 |
| CN | 204304028 | U | 4/2015 |
| CN | 104779487 | A | 7/2015 |
| CN | 104810657 | A | 7/2015 |
| CN | 105024230 | A | 11/2015 |
| CN | 105470732 | A | 4/2016 |
| CN | 105470736 | A | 4/2016 |
| CN | 105612664 | A | 5/2016 |
| CN | 105703159 | A | 6/2016 |
| CN | 105742854 | A | 7/2016 |
| CN | 106207569 | A | 12/2016 |
| CN | 205846279 | U | 12/2016 |
| CN | 107104329 | A | 8/2017 |
| CN | 104009303 | B | 1/2018 |
| CN | 107565279 | A | 1/2018 |
| CN | 105470679 | A | 4/2018 |
| CN | 207530119 | U | 6/2018 |
| CN | 105958245 | A | 9/2018 |
| CN | 109390806 | A | 2/2019 |
| CN | 109546384 | A | 3/2019 |
| CN | 109546388 | A | 3/2019 |
| CN | 109586086 | A | 4/2019 |
| CN | 109599724 | A | 4/2019 |
| CN | 109659726 | A | 4/2019 |
| CN | 109841981 | A | 6/2019 |
| CN | 109950721 | A | 6/2019 |
| CN | 208955335 | U | 6/2019 |
| CN | 109994892 | A | 7/2019 |
| CN | 209056665 | U | 7/2019 |
| CN | 110165448 | A | 8/2019 |
| CN | 110247233 | A | 9/2019 |
| CN | 110299649 | A | 10/2019 |
| CN | 110311251 | A | 10/2019 |
| CN | 110323622 | A | 10/2019 |
| CN | 110459919 | A | 11/2019 |
| CN | 110544850 | A | 12/2019 |
| CN | 110600943 | A | 12/2019 |
| CN | 110649407 | A | 1/2020 |
| CN | 110718815 | A | 1/2020 |
| CN | 110808499 | A | 2/2020 |
| CN | 110838635 | A | 2/2020 |
| CN | 111092342 | A | 5/2020 |
| CN | 111370890 | A | 7/2020 |
| CN | 111682366 | A | 9/2020 |
| CN | 111682369 | A | 9/2020 |
| CN | 113823958 | A | 12/2021 |
| CN | 114024160 | A | 2/2022 |
| CN | 115939875 | A | 4/2023 |
| JP | 2000-058172 | A | 2/2000 |
| TW | 415133 | B | 12/2000 |
| TW | 459428 | B | 10/2001 |
| TW | M461166 | U1 | 9/2013 |
| TW | I414111 | B | 11/2013 |
| TW | I452767 | B | 9/2014 |
| TW | I528659 | B | 4/2016 |
| TW | I545845 | B | 8/2016 |
| TW | MS37321 | U | 2/2017 |
| TW | 201733225 | A | 9/2017 |
| TW | I600231 | B | 9/2017 |
| TW | 201810825 | A | 3/2018 |
| TW | I623154 | B | 5/2018 |
| TW | 201834333 | A | 9/2018 |
| TW | 201841440 | A | 11/2018 |
| TW | I648925 | B | 1/2019 |
| TW | M585436 | U | 10/2019 |
| TW | 201943158 | A | 11/2019 |
| TW | M591270 | U | 2/2020 |
| TW | M593091 | U | 4/2020 |
| TW | 202046584 | A | 12/2020 |
| WO | WO 2016/168820 | A1 | 10/2016 |
| WO | WO 2017/106266 | A1 | 6/2017 |

* cited by examiner

BACKPLANE CONNECTOR WITH IMPROVED METAL SHIELD SURROUNDING MEMBER

CROSS-REFERENCE TO RELATED APPLICATIONS

This patent application is a continuation-in-part of U.S. patent application Ser. No. 17/341,129, filed on Jun. 7, 2021, which claims priority of a Chinese Patent Application No. 202010567796.4, filed on Jun. 19, 2020 and titled "BACKPLANE CONNECTOR ASSEMBLY", and a Chinese Patent Application No. 202021709484.4, filed on Aug. 17, 2020 and titled "BACKPLANE CONNECTOR", the entire content of which is incorporated herein by reference.

TECHNICAL FIELD

The present disclosure relates to a backplane connector which belongs to a technical field of connectors.

BACKGROUND

Existing backplane connectors generally include a housing and a plurality of terminal modules mounted to the housing. Each terminal module includes an insulating block, a plurality of conductive terminals fixed to the insulating block, and a metal shield surrounding member provided on a periphery of the insulating block. Each conductive terminal includes a contact portion for mating with a mating backplane connector and a mounting portion for being connected with a circuit board. In order to keep the mounting portions of the terminal modules in a positional relationship with each other so as to be mounted to the circuit board, some existing backplane connectors are further provided with a mounting block installed at a bottom of the terminal modules. The mounting block is usually made of insulating material, and defines a plurality of mounting holes for the mounting portions of the conductive terminals to pass through.

A metal shield surrounding member in the related art includes a surrounding portion and a mounting portion extending downwardly from the surrounding portion. The mounting portion is roughly U-shaped. The surrounding portion includes a first side wall, a second side wall opposite to the first side wall, a third side wall connecting one end of the first side wall and one end of the second side wall, and a fourth side wall connecting the other end of the first side wall and the other end of the second side wall. The mounting portion includes a fifth side wall located on a same side as the first side wall, a sixth side wall located on a same side as the third side wall, and a seventh side wall located on a same side as the fourth side wall. The fifth side wall is connected to the first side wall. The sixth side wall is located outside the third side wall and is disconnected from the third side wall. The seventh side wall is located outside the fourth side wall and is disconnected from the seventh side wall.

When the backplane connector is mated with the mating backplane connector, the grounding return can only be realized through the first side wall and the fifth side wall connected thereto. In other words, since the sixth side wall is disconnected from the third side wall and the seventh side wall is disconnected from the fourth side wall, the grounding return cannot be realized directly through the third side wall and the sixth side wall, nor directly through the fourth side wall and the seventh side wall.

Therefore, it is desirable to improve the metal shield surrounding member in the related art to improve shielding effect and grounding return effect.

SUMMARY

An object of the present disclosure is to provide a backplane connector with improved shielding effect and improved grounding return effect.

In order to achieve the above object, the present disclosure adopts the following technical solution: a backplane connector, including: a housing including a base, a first side wall portion extending from one end of the base, and a second side wall portion extending from another end of the base; the base, the first side wall portion and the second side wall portion jointly forming a receiving space for at least partially receiving a mating connector; a plurality of insulating protrusions protruding into the receiving space; a plurality of terminal modules, each terminal module being assembled to a corresponding insulating protrusion; and a plurality of metal shield surrounding members, each metal shield surrounding member being sleeved on the corresponding insulating protrusion; wherein the metal shield surrounding member includes a surrounding portion and a mounting portion extending downwardly from the surrounding portion; the surrounding portion includes a first side wall, a second side wall, a third side wall and a fourth side wall; the first side wall is disposed opposite to the third side wall; the second side wall is disposed opposite to the fourth side wall; the first side wall, the second side wall, the third side wall and the fourth side wall are enclosed to form a fully-enclosed shielding cavity; the mounting portion includes a sixth side wall, a seventh side wall and an eighth side wall; the sixth side wall is connected to the second side wall and is located on a same side of the metal shield surrounding member; the seventh side wall is connected to the third side wall and is located on a same side of the metal shield surrounding member; the eighth side wall is connected to the fourth side wall and is located on a same side of the metal shield surrounding member; and the seventh side wall protrudes outwardly beyond the third side wall along a direction away from the third side wall; and the eighth side wall protrudes outwardly beyond the fourth side wall along a direction away from the fourth side wall.

In order to achieve the above object, the present disclosure adopts the following technical solution: a backplane connector, including: a housing including a base, a first side wall portion extending upwardly from one end of the base, and a second side wall portion extending upwardly from another end of the base; the base, the first side wall portion and the second side wall portion jointly forming a receiving space for at least partially receiving a mating connector; the base defining a plurality of receiving grooves extending through the base; and a plurality of mounting modules assembled to the receiving grooves; each mounting module including an insulating body, a terminal module installed in the insulating body, and a metal shield surrounding member sleeved on the insulating body; wherein the metal shield surrounding member includes a surrounding portion and a mounting portion extending downwardly from the surrounding portion; the surrounding portion includes a first side wall, a second side wall; a third side wall and a fourth side wall; the first side wall is disposed opposite to the third side wall; the second side wall is disposed opposite to the fourth side wall; the first side wall, the second side wall, the third side wall and the fourth side wall are enclosed to form a fully-enclosed shielding cavity; the mounting portion includes a fifth side wall, a sixth side wall, a seventh side wall and an eighth side wall; the fifth side wall is disposed opposite to the seventh side wall; the sixth side wall is disposed opposite to the eighth side wall; the fifth side wall, the sixth side wall, the seventh side wall and the eighth side wall are enclosed to form another fully-enclosed shielding cavity; the fifth side wall is connected to the first side wall and is located on a same side of the metal shield surrounding member; the sixth side wall is connected to the second side wall and is located on a same side of the metal shield surrounding member; the seventh side wall is connected to the third side wall and is located on a same side of the metal shield surrounding member; the eighth side wall is connected to the fourth side wall and is located on a same side of the metal shield surrounding member; and the mounting portion is fixed in a corresponding receiving groove.

Compared with the prior art, the metal shield surrounding member in the present disclosure includes the surrounding portion and the mounting portion extending downwardly from the surrounding portion. The surrounding portion is formed by four side walls so as to form a fully-enclosed shielding cavity, thereby improving the shielding effect. Besides, the sixth side wall is connected to the second side wall and is located on the same side of the metal shield surrounding member; the seventh side wall is connected to the third side wall and is located on the same side of the metal shield surrounding member; and the eighth side wall is connected to the fourth side wall and is located on the same side of the metal shield surrounding member. In this way, the sixth side wall and the second side wall are able to form a grounding return; the seventh side wall and the third side wall are able to form a grounding return; and the eighth side wall and the fourth side wall are able to form a grounding return; thereby improving the grounding return effect of the backplane connector.

DETAILED DESCRIPTION

Figure 1:
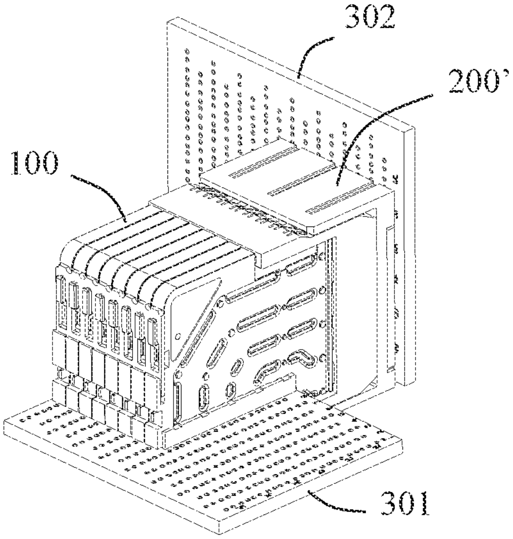
FIG. 1 is a perspective view of a backplane connector assembly in accordance with a first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
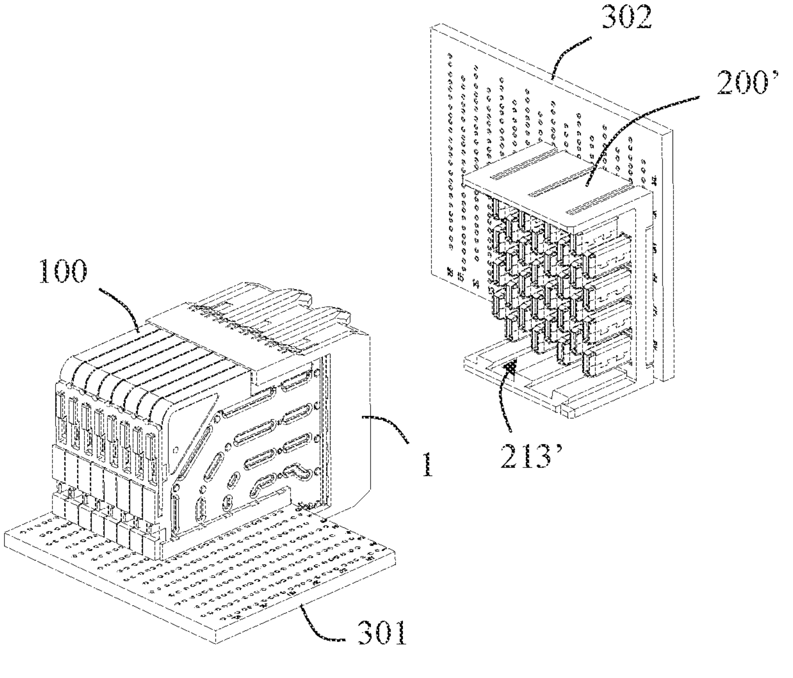
FIG. 2 is a partial perspective exploded view of FIG. 1.
Figure 3:
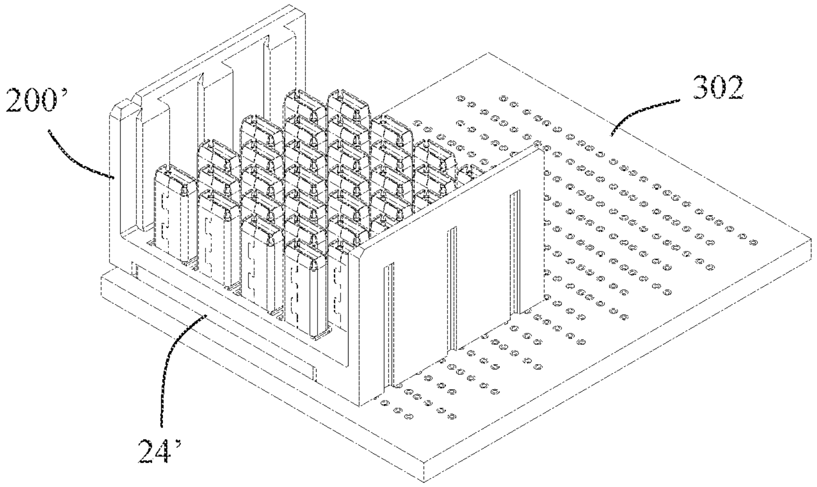
FIG. 3 is another view of the second backplane connector in FIG. 2 when it is mounted on a second circuit board.
Figure 4:
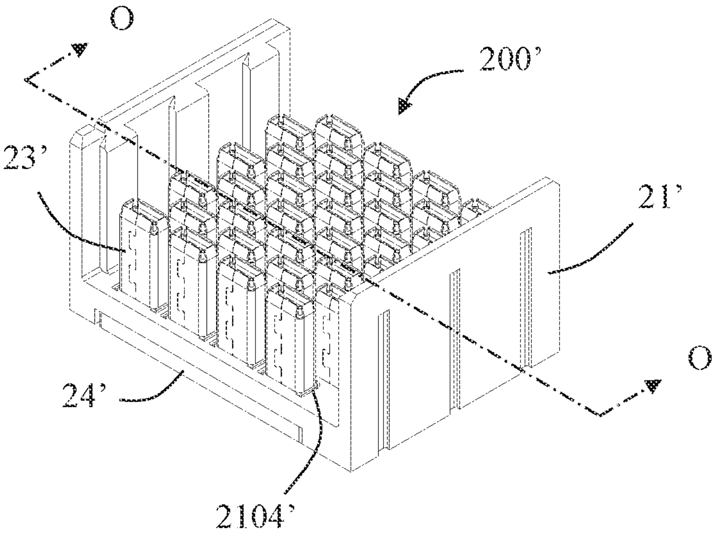
FIG. 4 is a perspective view of the second backplane connector in FIG. 3.
Figure 5:
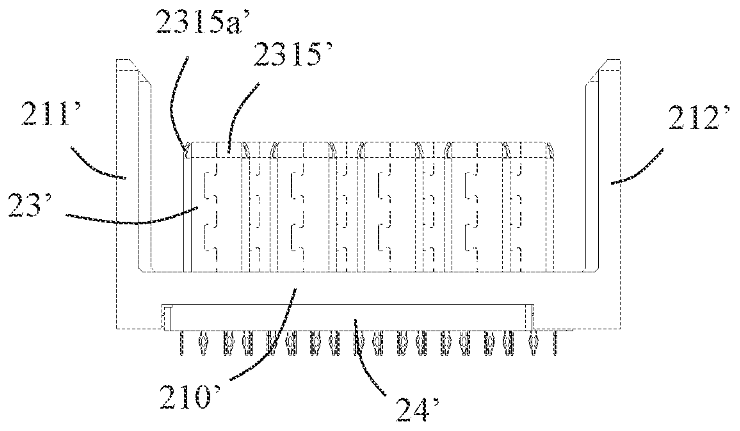
FIG. 5 is a front view of FIG. 4.
Figure 6:
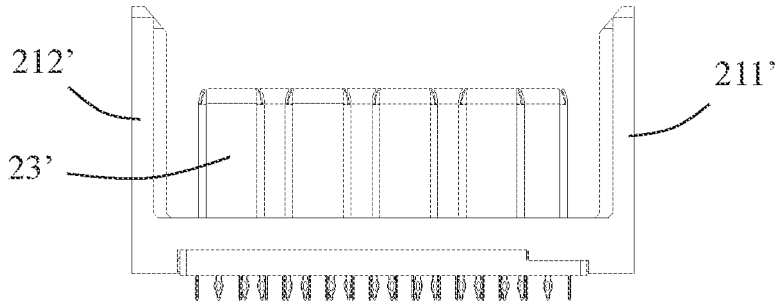
FIG. 6 is a rear view of FIG. 4.
Figure 7:
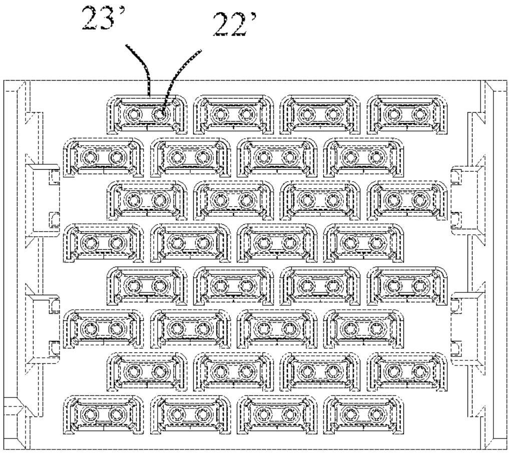
FIG. 7 is a top view of FIG. 4.
Figure 8:
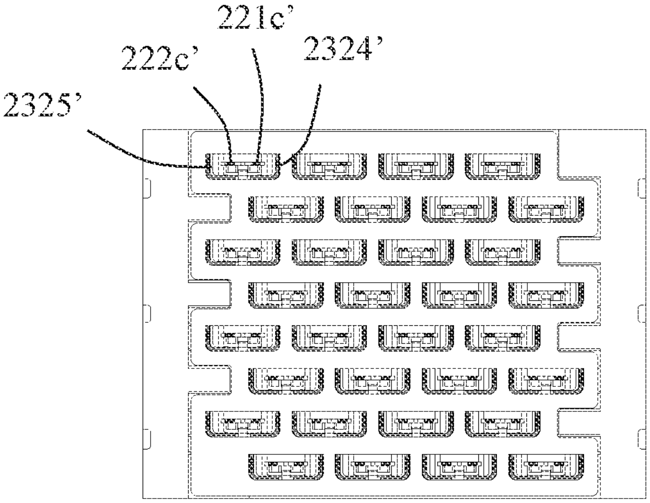
FIG. 8 is a bottom view of FIG. 4.

Referring to FIGS. 1 and 2, a first embodiment of the present disclosure discloses a backplane connector assembly which includes a first backplane connector 100, a second backplane connector 200' for mating with the first backplane connector 100, a first circuit board 301 mounted with the first backplane connector 100, and a second circuit board 302 mounted with the second backplane connector 200'. In the illustrated embodiment of the present disclosure, the first backplane connector 100 and the second backplane connector 200' are mated in an orthogonal manner. The first circuit board 301 is perpendicular to the second circuit board 302.

Referring to FIGS. 3 to 11, the second backplane connector 200' includes a housing 21', a plurality of terminal modules 22' assembled to the housing 21', a plurality of metal shield surrounding members 23' fixed to the second housing 21' and enclosing corresponding terminal modules 22', and a mounting block 24' mounted to the housing 21'.

Referring to FIGS. 9 and 13 to 15, the housing 21' is made of insulating material and includes a base 210', a first side wall portion 21' extending upwardly from one side of the base 210', and a second side wall portion 22' extending upwardly from the other side of the base 210'. The base 210', the first side wall portion 21' and the second side wall portion 22' jointly form a receiving space 213' for receiving a part of the first backplane connector 100. In the illustrated embodiment of the present disclosure, the first side wall portion 21' and the second side wall portion 22' are parallel to each other and both are perpendicular to the base 210'.

In the illustrated embodiment of the present disclosure, the housing 21' further includes a plurality of insulating protrusions 214' integrally extending from the base 210'. The plurality of insulating protrusions 214' are spaced apart from one another. The plurality of insulating protrusions 214' extend upwardly into the receiving space 213'. The terminal modules 22' are installed in the insulating protrusions 214'. The plurality of insulating protrusions 214' are disposed in multiple rows along a front-rear direction. The insulating protrusions 214' in two adjacent rows are disposed in a staggered manner, that is, the insulating protrusions 214' in the same position in two adjacent rows are not in alignment with each other in the front-rear direction. The base 210' includes a top surface 2101' exposed in the receiving space 213', a bottom surface 2102' opposite to the top surface 2101', two mounting protrusions 2103' respectively protruding downwardly from opposite sides of the bottom surface 2102', and a receiving groove 2100' located between the two mounting protrusions 2103'. The receiving groove 2100' is adapted for receiving the mounting block 24'.

Figure 14:
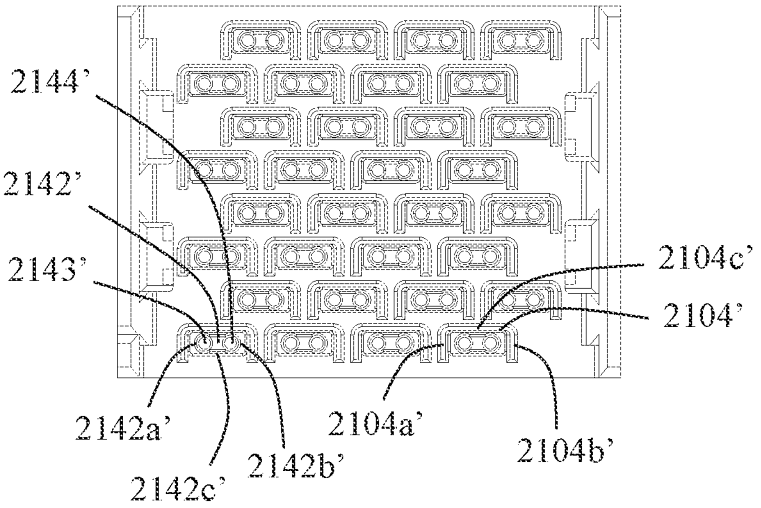
FIG. 14 is a top view of a housing in FIG. 11.
Figure 15:
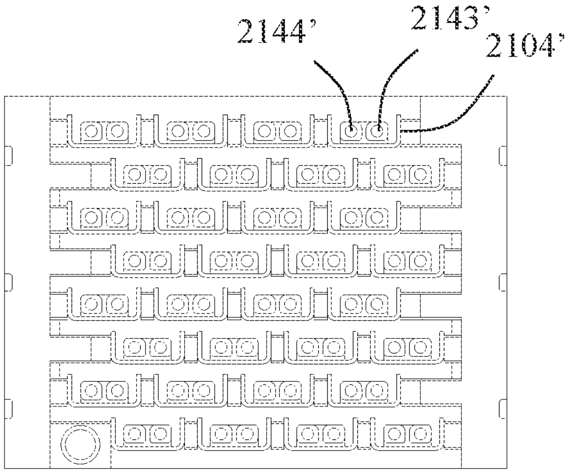
FIG. 15 is a bottom view of the housing in FIG. 11.

Referring to FIG. 14, the base 210' includes a plurality of positioning grooves 2104' extending through the top surface 2101'. In the illustrated embodiment of the present disclosure, each positioning groove 2104' is substantially U-shaped. The positioning groove 2104' is arranged around the corresponding insulating protrusion 214' and is used to install the corresponding metal shield surrounding member 23'. Specifically, each positioning groove 2104' includes a first positioning groove **2104*a*' extending along the front-rear direction, a second positioning groove 2104*b*' parallel to the first positioning groove 2104*a*', and a third positioning groove 2104*c*' communicating the first positioning groove 2104*a*' and the second positioning groove 2104*b*'. The third positioning groove 2104*c*' is perpendicular to the first positioning groove 2104*a*' and the second positioning groove 2104*b*'. In the illustrated embodiment of the present disclosure, each positioning groove 2104' also extends through the bottom surface 2102' so as to communicate with the receiving groove 2100'**.

Figure 12:
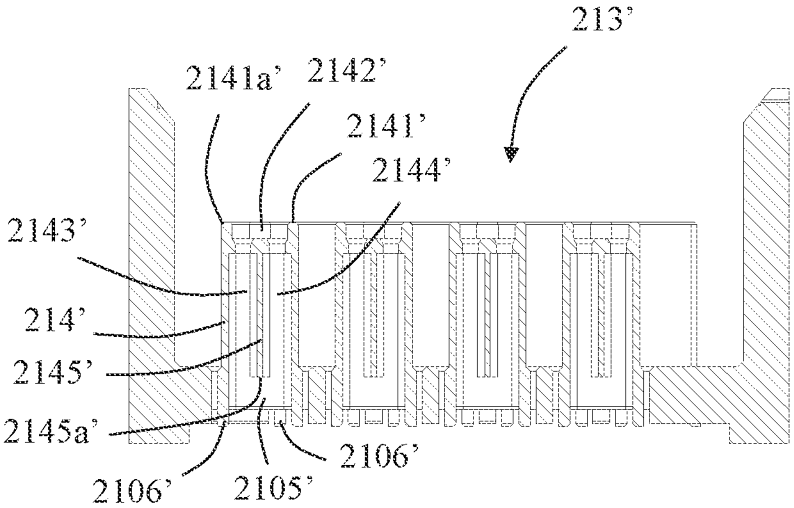
FIG. 12 is a schematic cross-sectional view taken along line L-L in FIG. 11.
Figure 13:
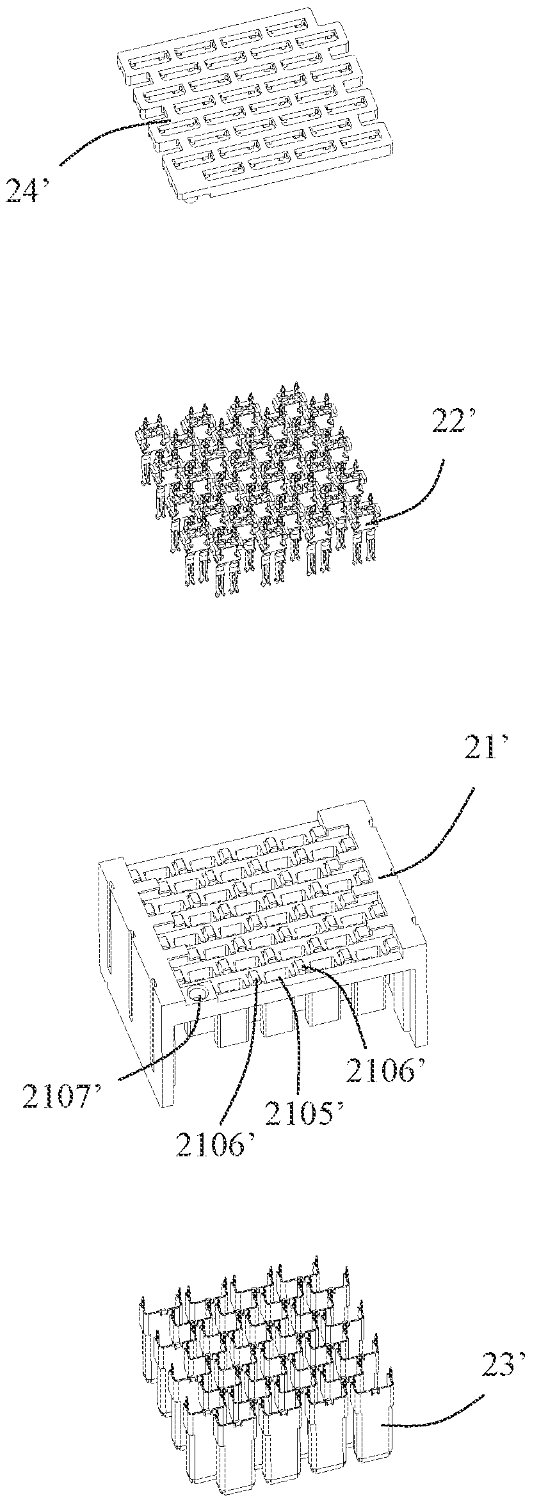
FIG. 13 is a perspective exploded view of the second backplane connector from another angle.

Referring to FIGS. 12 and 13, the bottom surface 2102' of the base 210' is also provided with a plurality of terminal receiving grooves 2105', a plurality of positioning protrusions 2106' located on both sides of each terminal receiving groove 2105, and a positioning hole 2107' for mating with the mounting block 24'. The terminal receiving groove 2105' extends through the bottom surface 2102' and is recessed into the insulating protrusion 214. Referring to FIG. 12, each insulating protrusion 214' is roughly cuboid shaped and includes an upper end surface 2141', a communicating groove 2142' extending through the upper end surface 2141', and a terminal receiving hole located at the bottom of the communicating groove 2142'. The terminal receiving hole communicates with the terminal receiving groove 2105'. In the illustrated embodiment of the present disclosure, the terminal receiving hole includes a first terminal receiving hole 2143' and a second terminal receiving hole 2144' arranged in parallel. Both the first terminal receiving hole 2143' and the second terminal receiving hole 2144' are round holes. The housing 21' is further provided with a partition 2145' for separating the first terminal receiving hole 2143' and the second terminal receiving hole 2144'. The partition 2145' has a bottom surface **2145*a*'. Four corners of the upper end surface 2141' include guiding inclined surfaces 2141*a*' for guiding installation of the meal shield surrounding member 23'. Referring to FIG. 14, the communicating groove 2142' includes a first arc-shaped groove 2142*a*' corresponding to the first terminal receiving hole 2143', a second arc-shaped groove 2142*b*' corresponding to the second terminal receiving hole 2144', and a straight slot 2142*c*' communicating the first arc-shaped groove 2142*a*' and the second arc-shaped groove 2142*b*'. The arc of the first arc-shaped groove 2142*a*' is a major arc, and the center of the major arc overlaps with the center of the first terminal receiving hole 2143'. Similarly, the arc of the second arc-shaped groove 2142*b*' is a major arc and the center of the major arc overlaps with the center of the second terminal receiving hole 2144'**.

Figure 9:
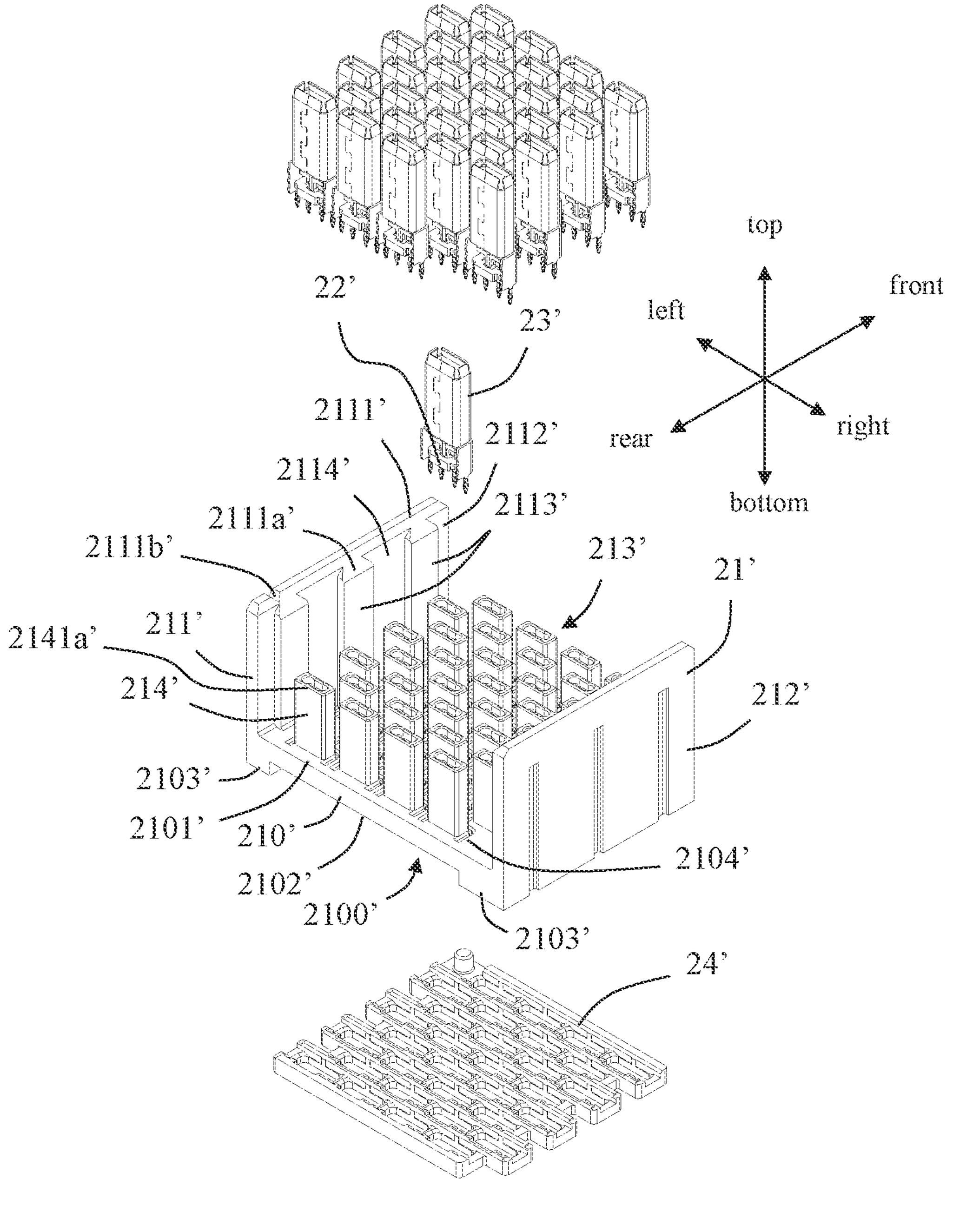
FIG. 9 is a partial perspective exploded view of the second backplane connector in FIG. 3.

Referring to FIG. 9, the first side wall portion 21' includes a first top surface 2111', a first inner side surface 2112', a plurality of first protrusions 2113' protruding inwardly from the first inner side surface 2112' into the receiving space 213', and a plurality of first positioning groove 2114' each of which is located between two adjacent first protrusions 2113'. In the illustrated embodiment of the present disclosure, the first positioning groove 2114' is a dovetail groove. The first positioning groove 2114' has two oppositely arranged inclined surfaces, thereby making the width of the first positioning groove 2114' close to the first inner side surface 2112' be larger than the width of the first positioning groove 2114' away from the first inner side surface 2112'. In addition, the first top surface 2111' has a first guiding inclined surface 2111*a*' inclined toward the receiving space 213' and a notch 2111*b*' extending upwardly through the first top surface 2111'. The notch 2111*b*' can serve an identification function to prevent the first backplane connector 100 from being inserted at a wrong angle. The first guiding inclined surface 2111*a*' further extends to the top of the plurality of first protrusions 2113'.

Figure 10:
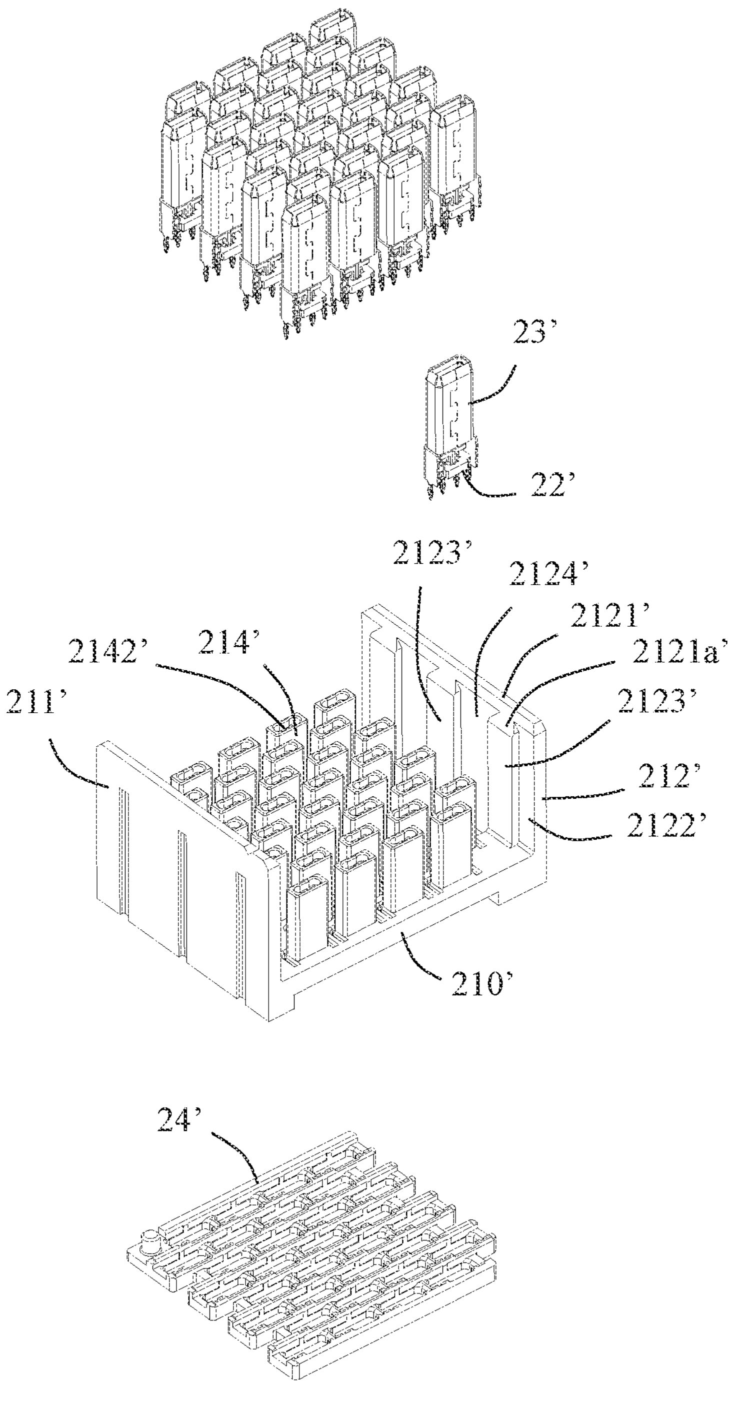
FIG. 10 is a partial perspective exploded view of FIG. 9 from another angle.
Figure 11:
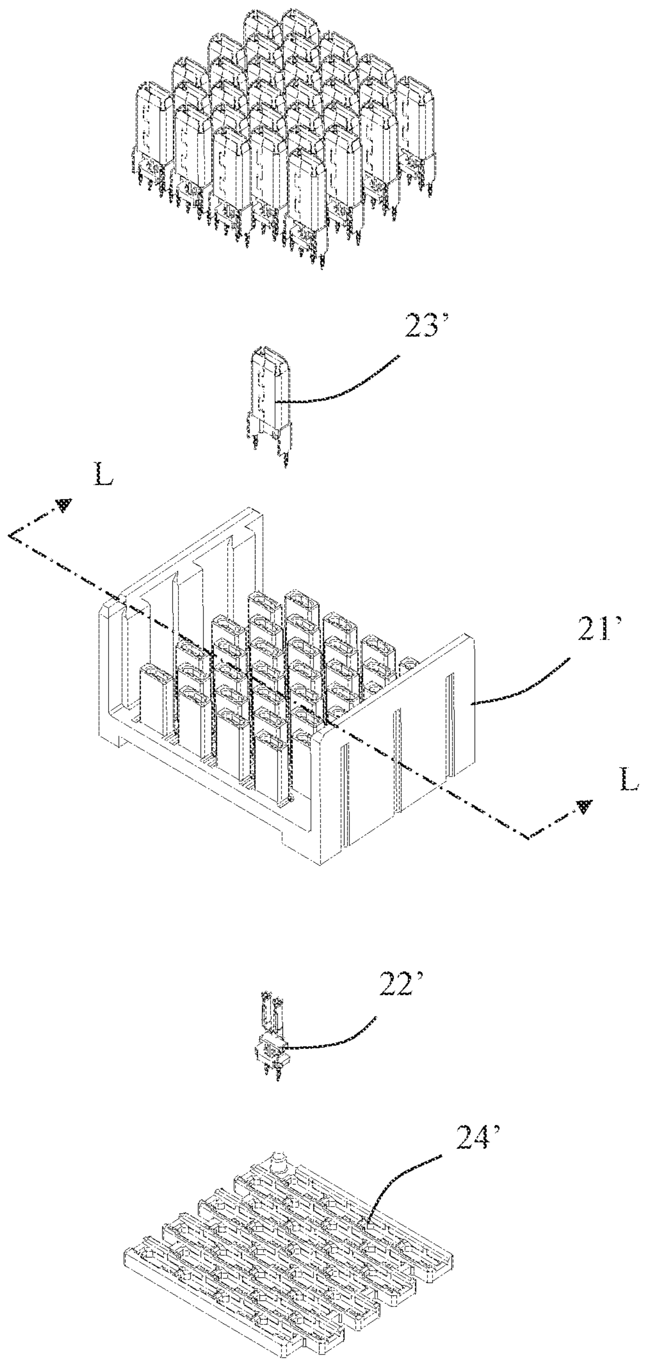
FIG. 11 is a further perspective exploded view of FIG. 9.

Referring to FIG. 10, the second side wall portion 22' includes a second top surface 2121', a second inner side surface 2122', a plurality of second protrusions 2123' protruding inwardly from the second inner side surface 2122' into the receiving space 213', and a plurality of second positioning grooves 2124' each of which is located between two adjacent second protrusions 2123'. In the illustrated embodiment of the present disclosure, the second positioning groove 2124' is a dovetail groove. The second positioning groove 2124' has two opposite inclined surfaces, thereby making the width of the second positioning groove 2124' close to the second inner side surface 2122' be larger than the width of the second positioning groove 2124' away from the second inner side surface 2122'. In addition, the second top surface 2121' has a second guiding inclined surface 2121*a*' which is inclined toward the receiving space 213'. The second guiding inclined surface 2121*d* further extends to the top of the plurality of second protrusions 2123'. The first guiding inclined surface 2111*a*' and the second guiding inclined surface 2121*a*' are used to guide the first backplane connector 100 to be inserted into the receiving space 213'. In the illustrated embodiment of the present disclosure, the first protrusions 2113' and the second protrusions 2123' are symmetrically disposed on opposite sides of the housing 21'. The first positioning grooves 2114' and the second positioning grooves 2124' are also symmetrically disposed on opposite sides of the housing 21'.

Figure 16:
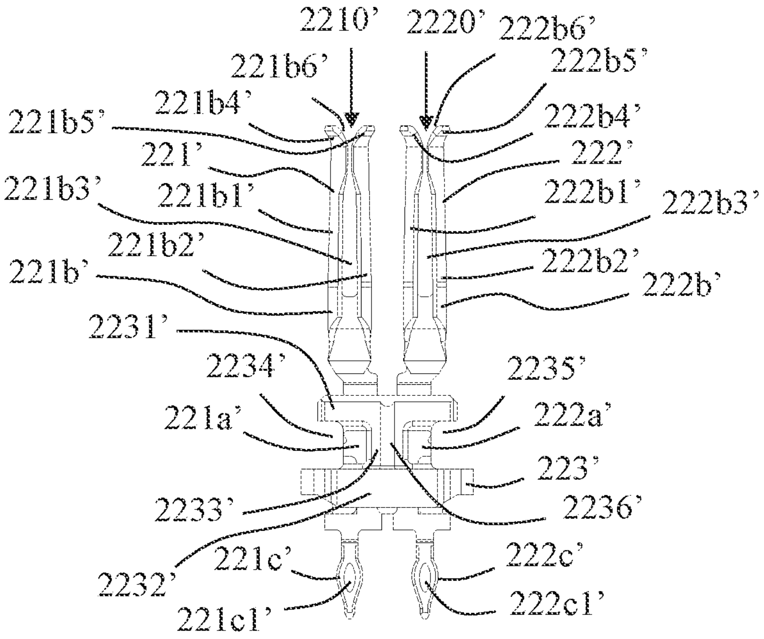
FIG. 16 is a front view of a terminal module in FIG. 11.
Figure 17:
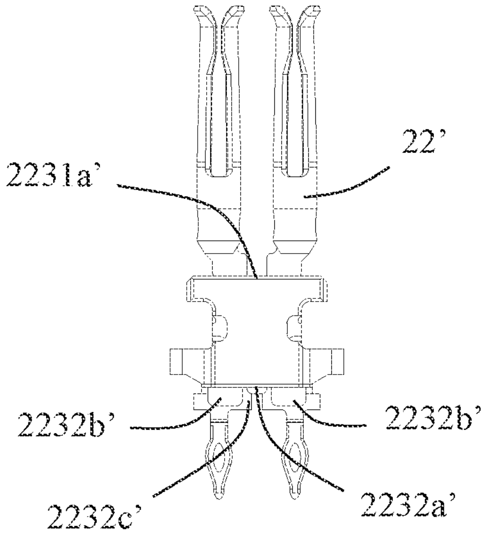
FIG. 17 is a rear view of the terminal module in FIG. 11.

Referring to FIGS. 16 and 17, each terminal nodule 22' includes a first signal terminal 221', a second signal terminal 222', and an insulating block 223' fixed to the first signal terminal 221' and the second signal terminal 222'. In an embodiment of the present disclosure, the first simal terminal 221' and the second signal terminal 222' are insert-molded with the insulating block 223'. In an embodiment of the present disclosure, the first signal terminal 221' and the second signal terminal 222' form a pair of differential signal terminals. In the illustrated embodiment of the present disclosure, the first signal terminal 221' and the second signal terminal 222' are symmetrically arranged along a central axis of the insulating block 223'.

The first signal terminal 221' includes a first fixing portion 221*a*' fixed to the insulating block 223', a first contact portion 221*b*' extending upwardly from the first fixing portion 221*a*', and a first mounting foot 221*c*' extending downwardly from the first fixing portion 221*a*'. The first mounting foot 221*c*' has a first fisheye hole 221*c*1' so that the first mounting foot 221*c*' has a certain elasticity. As a result, it facilitates pressing the first mounting foot 221*c*' into the conductive hole of the second circuit board 302 so as to achieve electrical conduction. The first contact portion 221*b*' has a two-half structure and includes a first contact piece 221*b*1', a second contact piece 221*b*2', and a first insertion hole 2210' located between the first contact piece 221*b*1' and the second contact piece 221*b*2'. The first contact piece 221*b*1' and the second contact piece 221*b*2' are separated by two first slots 221*b*3', so that the first contact portion 221*b*' has better elasticity, thereby improving the reliability of mating with the conductive terminals of a mating connector. In addition, the first contact piece 221*b*1' also includes a first flared portion 221*b*4' at its end. The second contact piece 221*b*2' also includes a second flared portion 221*b*5' at its end. The first flared portion 221*b*4' and the second flared portion 221*b*5' form a first bell mouth 221*b*6' communicating with the first insertion hole 2210' in order to guide the insertion of the conductive terminal of the mating connector.

The second signal terminal 222' includes a second fixing portion 222*a*' fixed to the insulating block 223', a second contact portion 222*b*' extending upwardly from the second fixing portion 222*a*', and a second mounting foot 222*c*' extending downwardly from the second fixing portion 222*a*'. The second mounting foot 222*c*' has a second fisheye hole 222*c*1' so that the second mounting foot 222*c*' has a certain elasticity. As a result, it facilitates pressing the second mounting foot 222*c*' into the conductive hole of the second circuit board 302 so as to achieve electrical conduction. The second contact portion 222*b*' has a two-half structure and includes a third contact piece 222*b*1', a fourth contact piece 222*b*2', and a second insertion hole 2220' located between the third contact piece 222*b*1' and the fourth contact piece 222*b*2'. The third contact piece 222*b*1' and the fourth contact piece 222*b*2' are separated by two second slots 222*b*3', so that the second contact portion 222*b*' has better elasticity, thereby improving the reliability of mating with the conductive terminals of a mating connector. In addition, the third contact piece 222*b*1' also includes a third flared portion 222*b*' at its end. The fourth contact piece 222*b*2' also includes a fourth flared portion 222*b*5' at its end. The third flared portion 222*b*4' and the fourth flared portion 222*b*5' form a second bell mouth 222*b*6' communicating with the second insertion hole 2220' in order to guide the insertion of the conductive terminal of the mating connector.

In the illustrated embodiment of the present disclosure, the insulating block 223' includes a top portion 2231', a bottom portion 2232', and a connection portion 2233' connecting the top portion 2231' and the bottom portion 2232'. The top portion 2231' is parallel to the bottom portion 2232'. The connection portion 2233' is perpendicular to the top portion 2231' and the bottom portion 2232'. An upper end and a lower end of the connection portion 2233' is connected to a middle of the top portion 2231' and a middle of the bottom portion 2232', respectively. The top portion 2231' has a top surface 2231*a*'. The length of the top portion 2231' is shorter than the length of the bottom portion 2232'. The insulating block 223' also includes a first opening 2234' and a second opening 2235' located between the top portion 2231' and the bottom portion 2232'. The first opening 2234' and the second opening 2235' are respectively located on both sides of the connection portion 2233'. The first fixing portion 221*a*' of the first signal terminal 221' is partially exposed in the first opening 2234', and the second fixing portion 222*a*' of the second signal terminal 222' is partially exposed in the second opening 2235' for adjusting impedance. The bottom portion 2232' includes a bottom surface 2232*a*', two protrusions 2232*b*' protruding downwardly from the bottom surface 2232*a*', and a positioning groove 2232*c*' located between the two protrusions 2232*b*'. The two protrusions 2232*b*' respectively abut against the bottom end of the first fixing portion 221*a*' and the bottom end of the second fixing portion 222*a*'. The outer peripheral surface of the insulating block 223' also includes a plurality of ribs 2236'. The outer surface of the rib 2236' is in the shape of a semicircular arc. In the illustrated embodiment of the present disclosure, the rib 2236' is located in the middle position of the two sides of the top portion 2231' and in the middle position of the front end surface of the connection portion 2233'. Of course, in other embodiments, the ribs 2236' can also be arranged on both sides of the bottom portion 2232' and/or the front end surface of the bottom portion 2232'. The rib 2236' is used to abut against the housing 21' in order to improve the reliability of installation.

Figure 18:
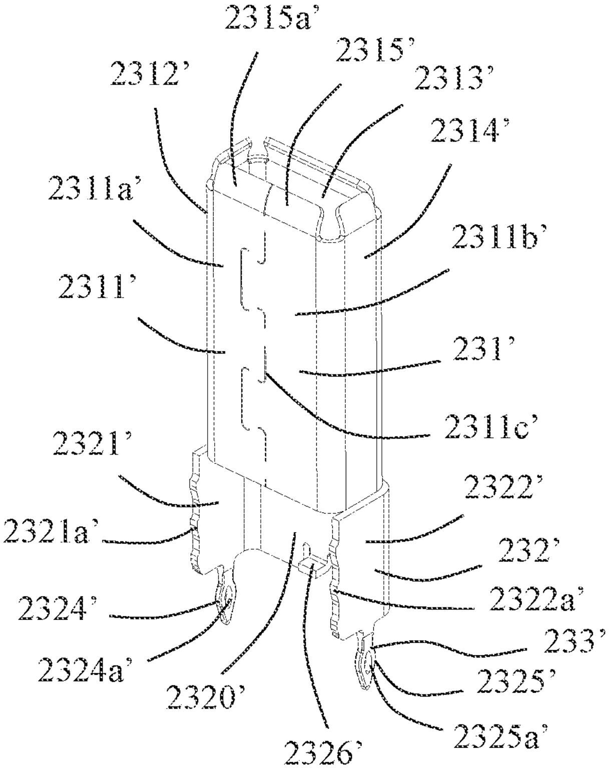
FIG. 18 is a perspective schematic view of a metal shield surrounding member.
Figure 19:
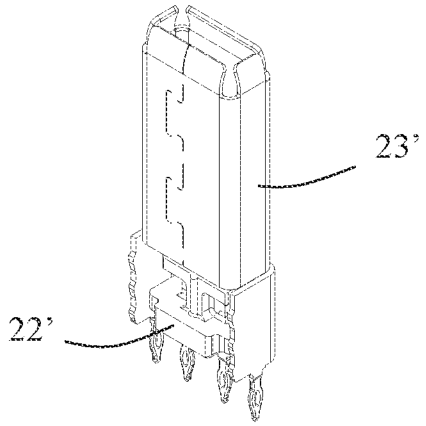
FIG. 19 is a perspective schematic view of the metal shield surrounding member sleeved on the terminal module.
Figure 20:
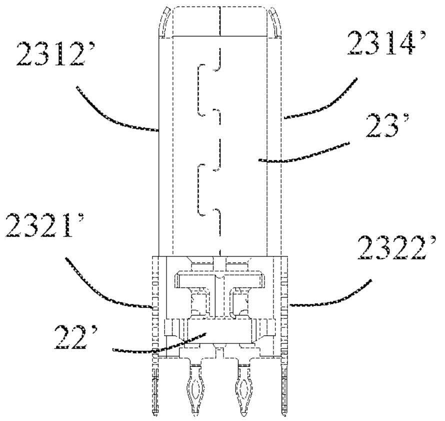
FIG. 20 is a front view of FIG. 19.
Figure 21:
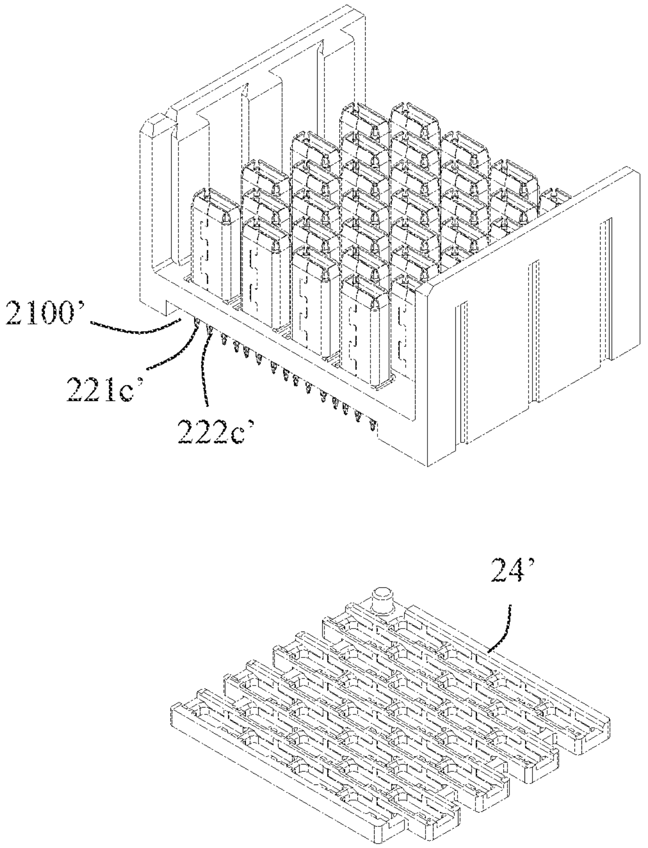
FIG. 21 is a partial perspective exploded view of the second backplane connector.
Figure 22:
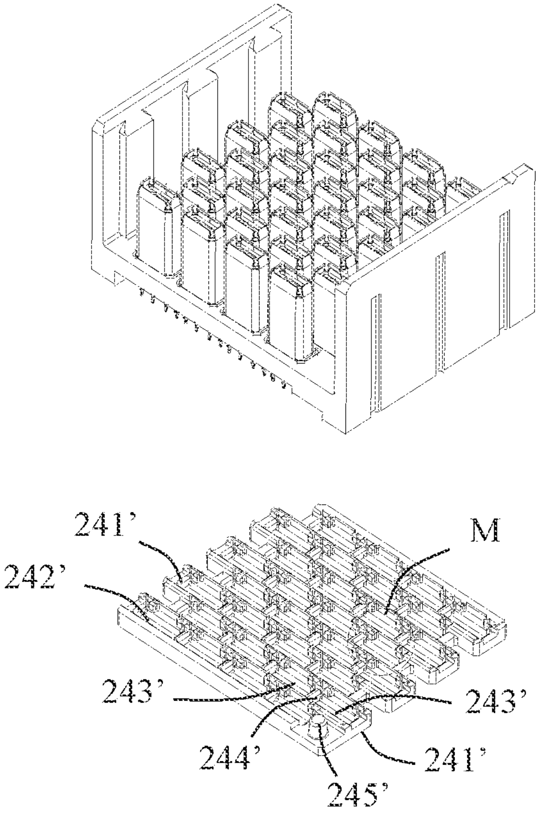
FIG. 22 is another partial perspective exploded view of the second backplane connector.
Figure 23:
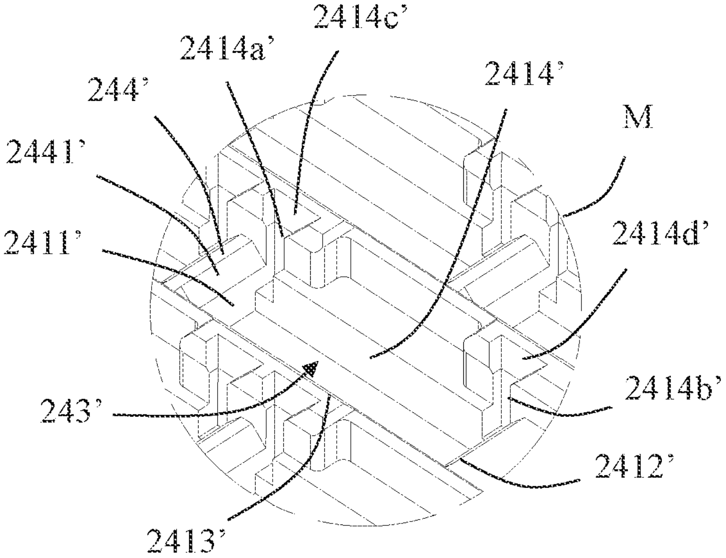
FIG. 23 is a partial enlarged view of a circled part M in FIG. 22.
Figure 24:
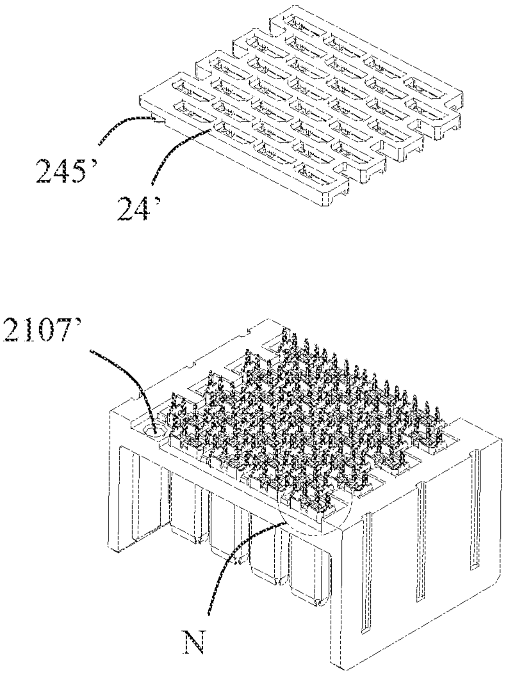
FIG. 24 is a partially exploded perspective view of FIG. 22 from another angle.
Figure 25:
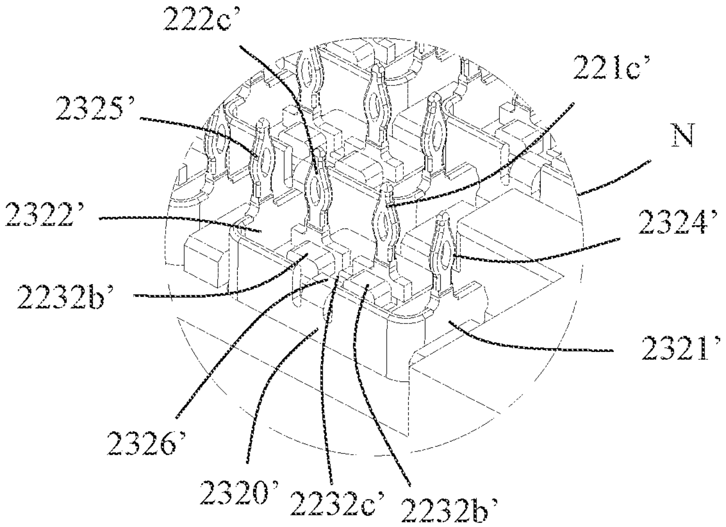
FIG. 25 is a partial enlarged view of a circled part N in FIG. 24.
Figure 26:
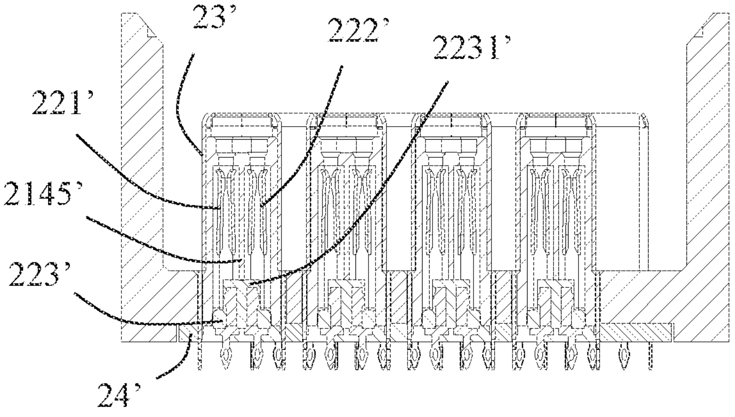
FIG. 26 is a schematic cross-sectional view taken along line O-O in FIG. 4.
Figure 27:
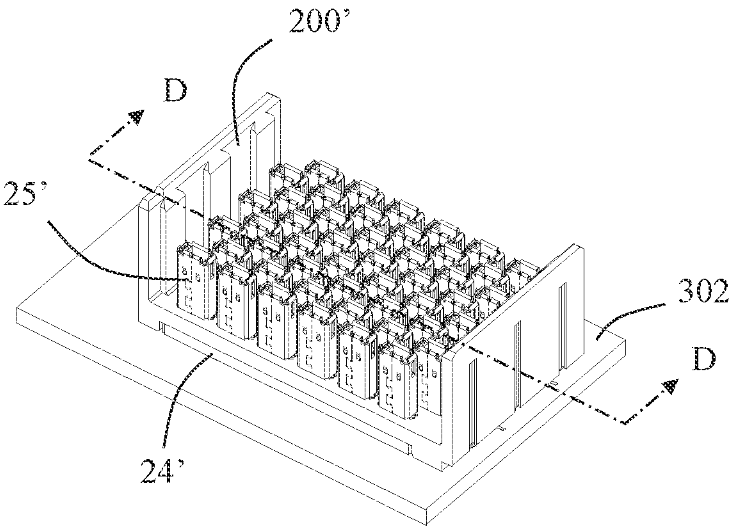
FIG. 27 is a schematic perspective view of a second backplane connector installed on a second circuit board in accordance with a second embodiment of the present disclosure.
Figure 28:
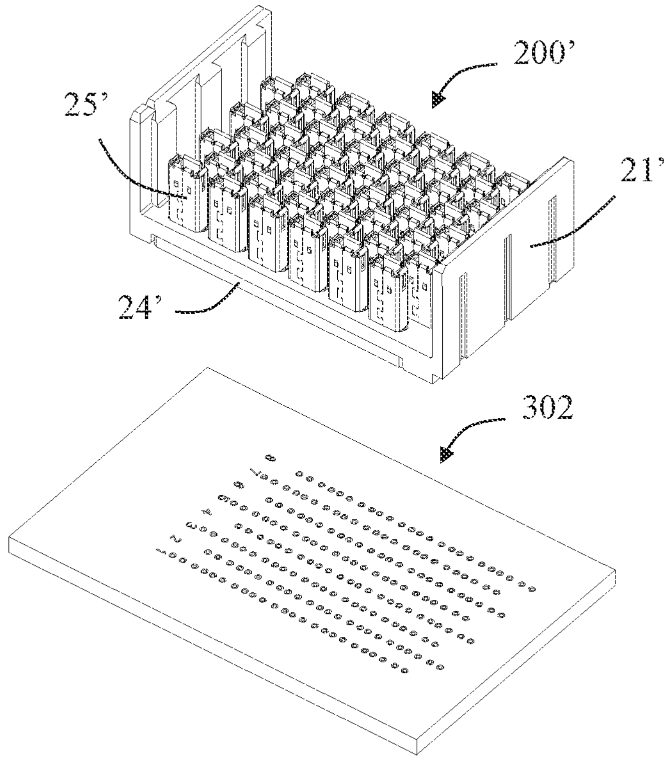
FIG. 28 is an exploded perspective view of the second backplane connector and the second circuit board in FIG. 27.
Figure 29:
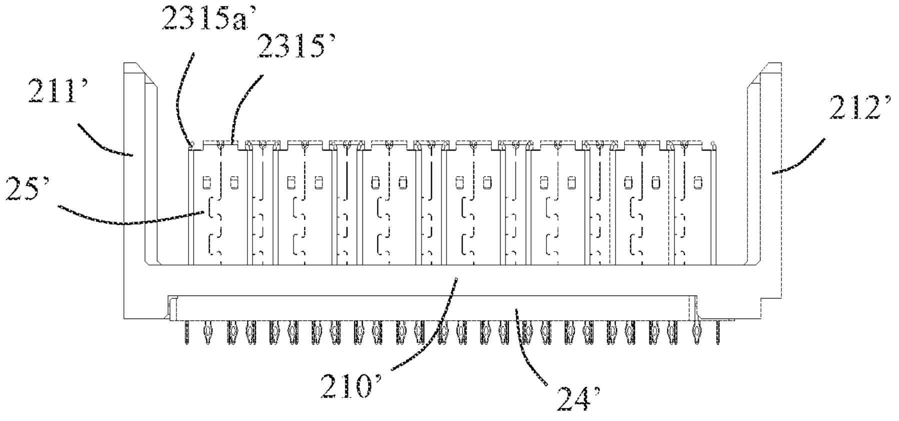
FIG. 29 is a front view of the second backplane connector in FIG. 27.
Figure 30:
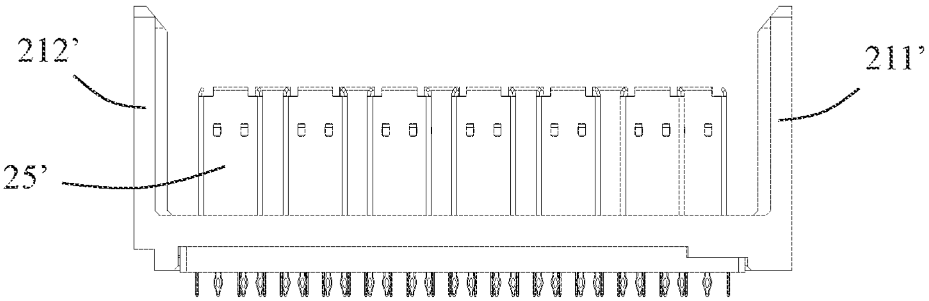
FIG. 30 is a rear view of FIG. 29.
Figure 31:
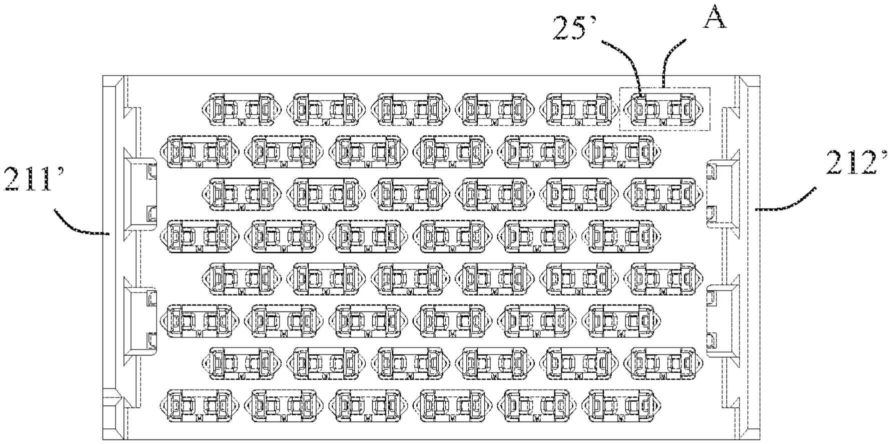
FIG. 31 is a top view of FIG. 29.
Figure 32:
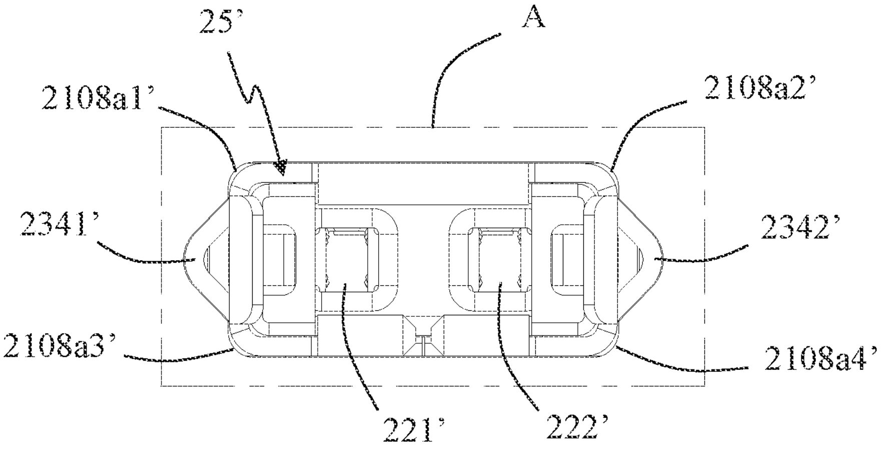
FIG. 32 is a partially enlarged view of a frame part A in FIG. 31.
Figure 33:
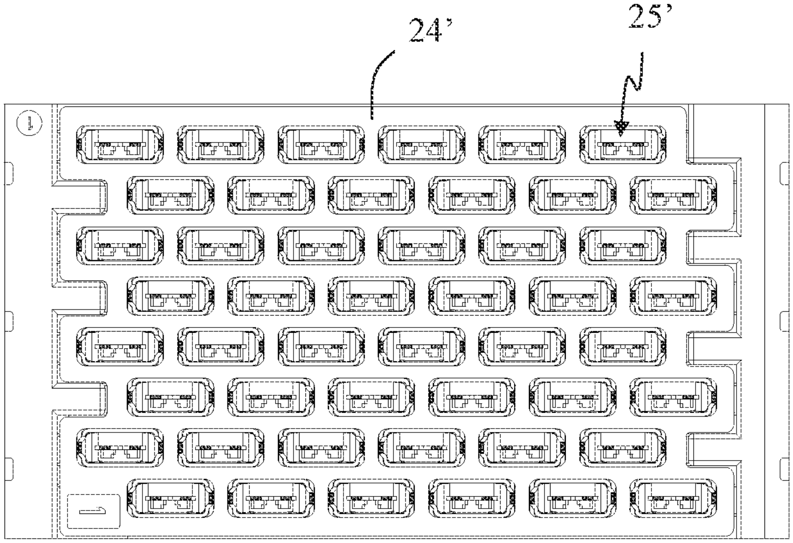
FIG. 33 is a bottom view of FIG. 29.

Referring to FIGS. 18 to 20. In the illustrated embodiment of the present disclosure, the metal shield surrounding member 23' is formed by stamping, bending and riveting a metal plate. The metal shield surrounding member 23' includes a surrounding portion 231', a mounting portion 232' extending downwardly from the surrounding portion 231', and a plurality of mounting feet 233' extending downwardly from the mounting portion 232'. The surrounding portion 231' includes a first side wall 2311', a second side wall 2312', a third side wall 2313' and a fourth side wall 2314' which are connected in sequence. The first side wall 2311' is opposite to the third side wall 2313', and the second side wall 2312' is opposite to the fourth side wall 2314', thereby forming an enclosed shielding cavity. Of course, in other embodiments, the shielding cavity may also be of a non-enclosed type. For example, the surrounding portion 231' includes a first side wall 2311', a second side wall 2312', and a third side wall 2313' which are connected in sequence, so that the surrounding portion 231' is substantially U-shaped. In the illustrated embodiment of the present disclosure, areas of the first side wall 2311' and the third side wall 2313' are larger than areas of the second side wall 2312' and the fourth side wall 2314'. Each end of the first side wall 2311', the second side wall 2312', the third side wall 2313' and the fourth side wall 2314' includes a deflection portion 2315' which is bent inwardly. The deflection portions 2315' are independent from one another so that they can be bent independently in order to avoid mutual interference. Each deflection portion 2315' has a guiding portion **2315*a*' on its outer surface. By providing the deflection portions 2315', a constricted opening can be formed at the end of the metal shield surrounding member 23'. The guiding portion 2315*a*' can guide the deflection portions 2315' from being easily inserted into the first backplane connector 100. In the illustrated embodiment of the present disclosure, the first side wall 2311' includes a first wall portion 2311*a*' and a second wall portion 2311*b*'. The first wall portion 2311*a*' and the second wall portion 2311*b*' are fixed together by riveting. A riveting line 2311*c*' is formed at a junction of the first wall portion 2311*a*' and the second wall portion 2311*b*'. In other embodiments of the present disclosure, it is also possible that only the ends of at least three of the first side wall 2311', the second side wall 2312', the third side wall 2313' and the fourth side wall 2314' which are connected to each other, are provided with the deflection portions 2315' bent inwardly. For example, the deflection portions 2315' bent inwardly are provided at the ends of the second side wall 2312', the third side wall 2313' and the fourth side wall 2314'** which are sequentially connected.

In the illustrated embodiment of the present disclosure, the mounting portion 232' is substantially U-shaped, and includes a connecting portion 2320', a first bending portion 2321' bent from one side of the connecting portion 2320', a second bending portion 2322' bent from the other side of the connecting portion 2320', a first tail portion 2324' extending downwardly from the first bending portion 2321', and a second tail portion 2325' extending downwardly from the second bending portion 2322'. The first bending portion 2321' is fixed in the first positioning groove **2104*a*'. The second bending portion 2322' is fixed in the second positioning groove 2104*b*'. The connecting portion 2320' is fixed in the third positioning groove 2104*c*'. The connecting portion 2320' is coplanar with the third side wall 2313'. The first bending portion 2321' and the second side wall 2312' are located on the same side. The first bending portion 2321' protrudes outwardly beyond the second side wall 2312'. The second bending portion 2322' and the fourth side wall 2314' are located on the same side. The second bending portion 2322' protrudes outwardly beyond the fourth side wall 2314'. The mounting portion 232' also includes a bottom retaining portion 2326' located at the connecting portion 2320'. In the illustrated embodiment of the present disclosure, when the metal shield surrounding member 23' is not mounted to the insulating protrusion 214', the retaining portion 2326' and the connecting portion 2320' are located in the same plane. After the metal shield surrounding member 23' is installed to the insulating protrusion 214', the retaining portion 2326' is bent inwardly (that is, in a direction toward the first side wall 2311') so that the retaining portion 2326' is perpendicular to the connecting portion 2320'. The retaining portion 2326' is located in the middle of the bottom edge of the connecting portion 2320'. A plurality of first barbs 2321*a*' are further provided on the side of the first bending portion 2321' away from the third side wall 2313'. A plurality of second barbs 2322*a*' are further provided on the side of the second bending portion 2322' away from the third side wall 2313'. The first barbs 2321*a*' and the second barbs 2322*a*' both extend beyond the first side wall 2311' to be fixed the housing 21'. The first tail portion 2324' is provided with a first fisheye hole 2324*a*', so that the first tail portion 2324' has a certain degree of elasticity. Therefore, the first tail portion 2324' can be easily pressed into the conductive hole of the second circuit board 302 for achieving electrical conduction. The second tail portion 2325' is provided with a second fisheye hole 2325*a*', so that the second tail portion 2325' has a certain elasticity. Therefore, the second tail portion 2325' can be easily pressed into the conductive hole of the second circuit board 302 for achieving electrical conduction. In the illustrated embodiment of the present disclosure, the first tail portion 2324' and the second tail portion 2325' are arranged parallel to each other and are in alignment with each other along a left-right direction. The first tail portion 2324' and the second tail portion 2325' are perpendicular to the first mounting foot 221*c*' and the second mounting foot 222*c*'**.

Referring to FIGS. 22 to 26, the mounting block 24' includes a plurality of mounting bars 241' arranged in a staggered manner and connected as a whole. Each mounting bar 241' includes a positioning groove 242' for positioning the mounting portion 232'. Specifically, each mounting bar 241' includes a plurality of openings 243' in a substantially rectangular shape, and the openings 243' of two adjacent rows of the mounting bars 241' are arranged in a staggered manner. Two adjacent openings 243' on the same mounting bar 241' are separated by a partition wall 244' located between the two adjacent openings 243'. The mounting block 24' includes a first inner side surface 2411', a second inner side surface 2412' opposite to the first inner side surface 2411', a third inner side surface 2413' connecting the first inner side surface 2411' and the second inner side surface 2412', and a fourth inner side surface 2414' connecting the first inner side surface 2411' and the second inner side surface 2412'. The fourth inner side surface 2414' is opposite to the third inner side surface 2413'. Opposite ends of the fourth inner side surface 2414' include a first opening **2414*a*' and a second opening 2414*b*', respectively. In addition, opposite ends of the fourth inner side surface 2414' include a first bell mouth 2414*c*' located above a first opening 2414*a*' and a second bell mouth 2414*d*' located above a second opening 2414*b*'. The first inner side surface 2411', the second inner side surface 2412' and the third inner side surface 2413' are connected to form a U-shape configuration for receiving the mounting portion 232'. The first bell mouth 2414*c*' and the first opening 2414*a*' are used to allow the first tail portions 2324' to pass through and achieve positioning. The second bell mouth 2414*d*' and the second opening 2414*b*' are used to allow the second tail portions 2325' to pass through and achieve positioning. In an embodiment of the present disclosure, the mounting block 24' is made of electroplated plastic so as to achieve a better shielding effect. The mounting block 24' includes a positioning post 245' for mating with the positioning hole 2107'**.

When assembling, firstly, the plurality of metal shield surrounding members 23' are sleeved on the insulating protrusions 214' along a top-to-bottom direction, so that the surrounding portions 231' enclose the insulating protrusions 214'. The U-shaped mounting portions 232' are inserted into the U-shaped positioning grooves 2104'. The first tail portions 2324' and the second tail portions 2325' respectively extend through the first positioning grooves **2104*a*' and the second positioning grooves 2104*b*'. The first tail portions 2324' and the second tail portions 2325' extend beyond the bottom surface 2102' and are exposed in the receiving groove 2100'. The mounting portions 232' are partially exposed in the receiving groove 2100' to increase the shielding length of the first signal terminal 221' and the second signal terminal 222'. When the metal shield surrounding members 23' are installed in place, the first barbs 2321*a*' and the second barbs 2322*a*' will pierce the inner wall of the terminal receiving grooves 2105'** so as to improve the fixing force.

Secondly, the terminal modules 22' are inserted into the corresponding positioning grooves 2104' along a bottom-to-top direction. At this time, the ribs 2236' of the insulating blocks 223' press against the inner walls of the terminal receiving grooves 2105' so as to improve the installation reliability. When the terminal modules 22' are installed in place, top surfaces **2231*a*' of the insulating blocks 223' abut against bottom surfaces 2145*a*' of the partition 2145' in order to achieve position restriction. The first contact portions 221*b*' of the first signal terminals 221' and the second contact portions 222*b*' of the second signal terminals 222' respectively extend into the first terminal receiving holes 2143' and the second terminal receiving holes 2144'. The first mounting feet 221*c*' of the first signal terminals 221' and the second mounting feet 222*c*' of the second signal terminals 222' extend beyond the bottom surface 2102' and are exposed in the receiving groove 2100'**.

Thirdly, the retaining portions 2326' are bent inwardly so that the retaining portions 2326' is located in the positioning grooves **2232*c*' and abut against the corresponding insulating blocks 223'. With this arrangement, on the one hand, the metal shield surrounding members 23' can be prevented from escaping upwardly from the insulating protrusions 214', and on the other hand, the terminal modules 22' can be prevented from being separated from the housing 21'**.

Finally, the mounting block 24' is installed in the receiving groove 2100' along the bottom-to-top direction. At this time, the U-shaped mounting portions 232' are inserted into the openings 243' of the mounting block 24' under the guidance of the first bell mouth **2414*c*' and the second bell mouth 2414*d*'. At this time, the first bending portions 2321' abut against the first inner side surfaces 2411'. The second bending portions 2322' abut against the second inner side surfaces 2412'. The connecting portions 2320' abut against the fourth inner side surfaces 2414'. The first tail portions 2324' and the second tail portions 2325' of the metal shield surrounding members 23', the first mounting feet 221*c*' of the first signal terminals 221', and the second mounting feet 222*c*' of the second signal terminals 222' extend through the openings 243' of the mounting block 24' to be electrically connected to the second circuit board 302**.

When the first backplane connector 100 is mated with the second backplane connector 200', the first housing 1 of the first backplane connector 100 is inserted into the receiving space 213' of the housing 21' of the second backplane connector 200'. The surrounding portions 231' of the terminal modules 22' of the second backplane connector 200' are inserted into the first terminal modules 2 of the first backplane connector 100 under the guidance of the deflection portions 2315'.

Referring to FIG. 27 to FIG. 46, the second backplane connector 200' in a second embodiment of the present disclosure includes a housing 21', a plurality of mounting modules 25' mounted to the housing 21', and a mounting block 24' mounted to the housing 21'. Each mounting module 25' includes an insulating body 26', a terminal module 22' installed in the insulating body 26', and a metal shield surrounding member 23' sleeved on the insulating body 26'.

Figure 34:
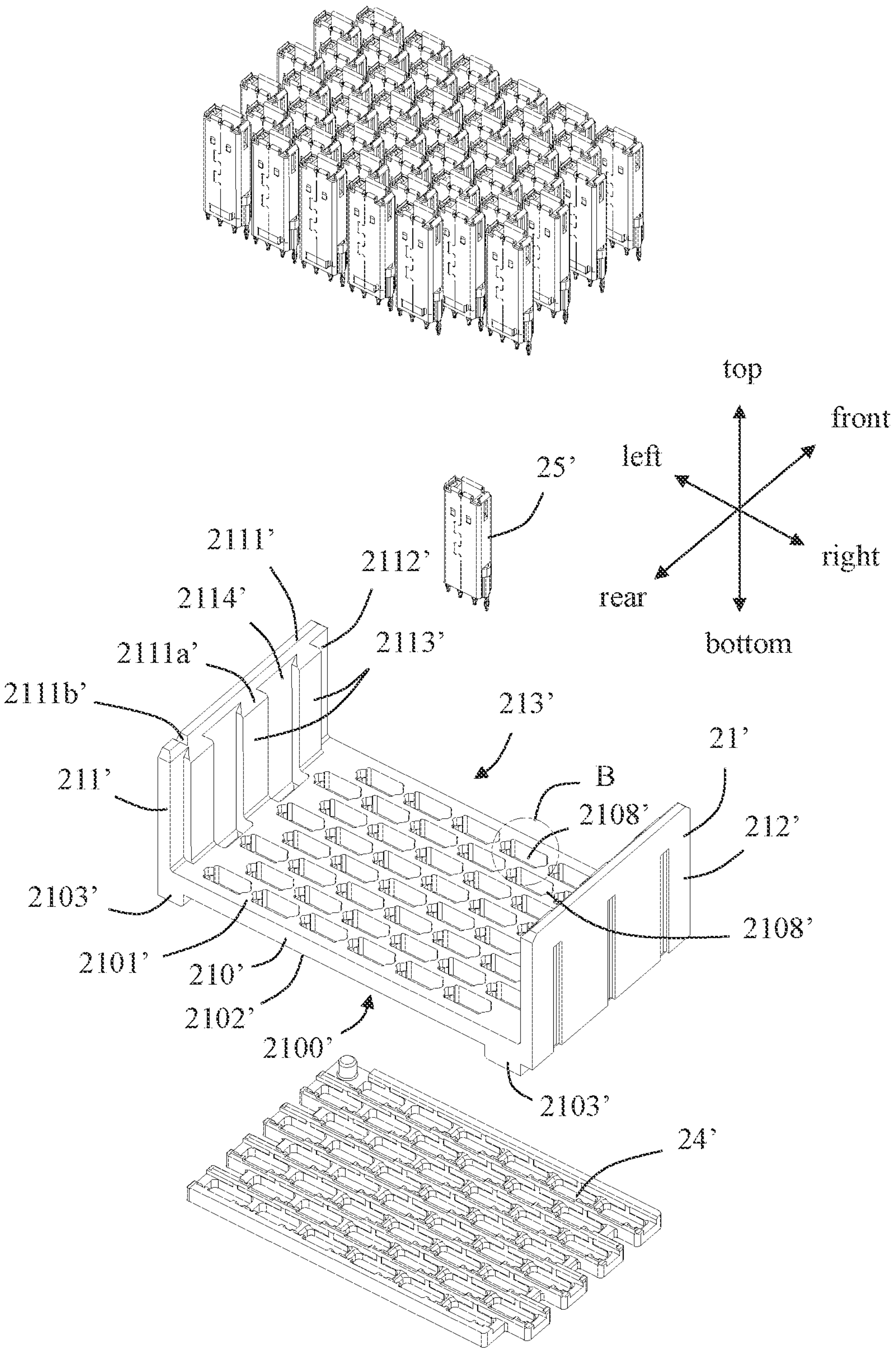
FIG. 34 is a partial perspective exploded view of the second backplane connector in FIG. 28.
Figure 35:
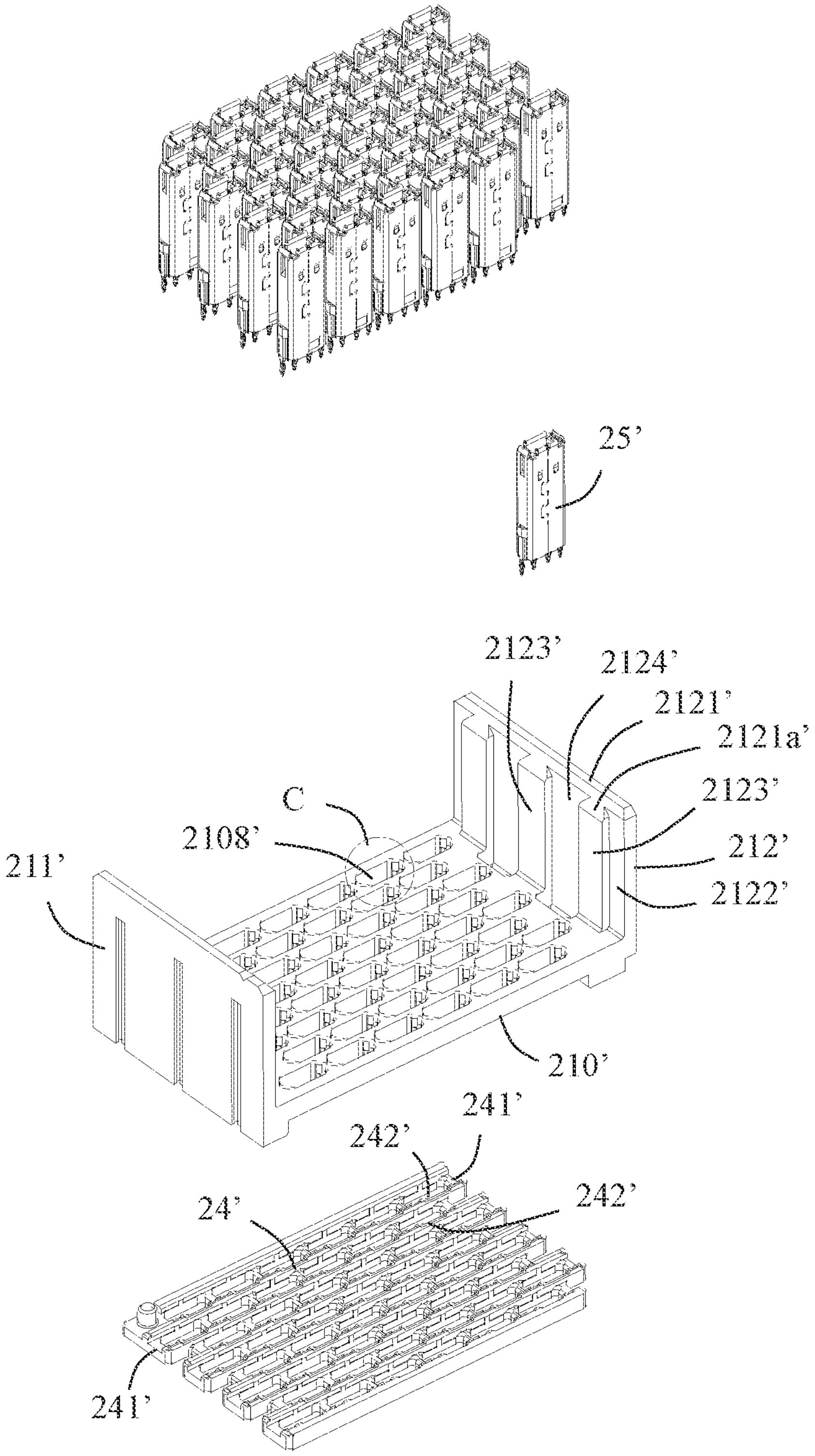
FIG. 35 is a partial perspective exploded view of FIG. 34 from another angle.
Figure 36:
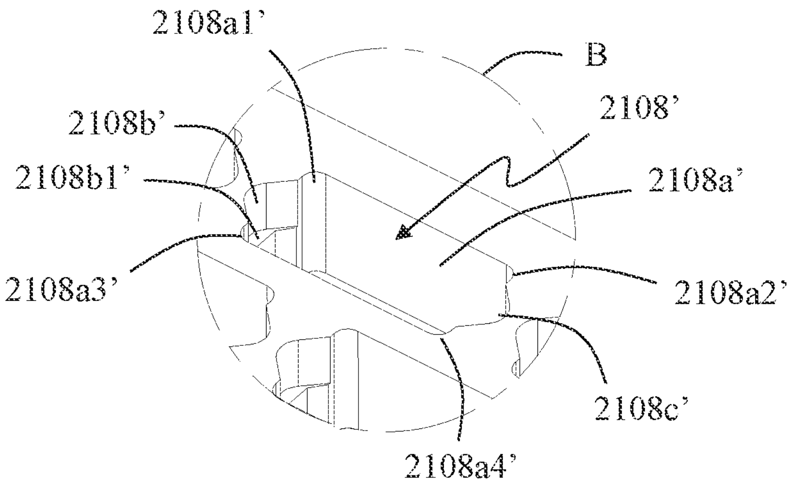
FIG. 36 is a partially enlarged view of a circled part B in FIG. 34.
Figure 37:
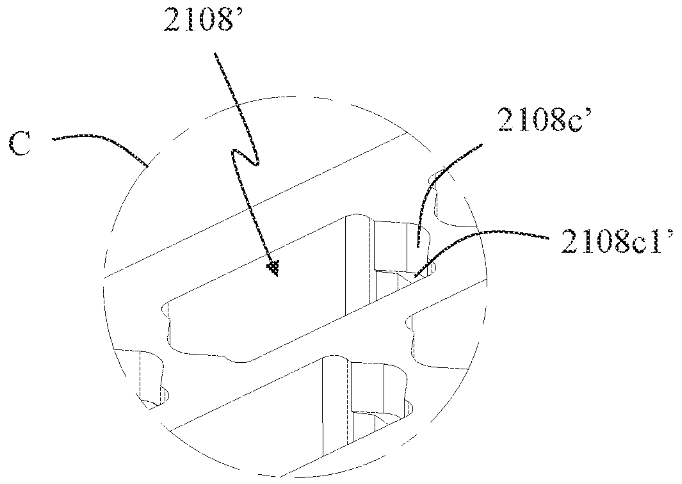
FIG. 37 is a partially enlarged view of a circled part C in FIG. 35.

Referring to FIG. 34 and FIG. 35, the housing 21' is made of insulating material and includes a base 210', a first side wall portion 211' extending upwardly from one side of the base 210', and a second side wall portion 212' extending upwardly from the other side of the base 210'. The base 210', the first side wall portion 211' and the second side wall portion 212' jointly form a receiving space 213' for receiving a part of the first backplane connector 100. In the illustrated embodiment of the present disclosure, the first side wall portion 211' and the second side wall portion 212' are parallel to each other and both are perpendicular to the base 210'.

In the illustrated embodiment of the present disclosure, the base 210' includes a top surface 2101' exposed in the receiving space 213', a bottom surface 2102' opposite to the top surface 2101', two mounting protrusions 2103' respectively protruding downwardly from opposite sides of the bottom surface 2102', and a receiving groove 2100' located between the two mounting protrusions 2103'. The receiving groove 2100' is adapted for receiving the mounting block 24'.

As shown in FIG. 34 to FIG. 37, the base 210' further includes a plurality of receiving grooves 2108' extending through the top surface 2101' and the bottom surface 2102'. The plurality of receiving grooves 2108' are arranged in multiple rows along a front-rear direction. The receiving grooves 2108' in two adjacent rows are staggered. That is, the receiving grooves 2108' at a corresponding position in two adjacent rows are not aligned along the front-rear direction. In the illustrated embodiment of the present disclosure, each receiving groove 2108' includes a main groove **2108*a*' in the middle, a first groove 2108*b*' located on one side of the main groove 2108*a*', and a second groove 2108*c*' located on the other side of the main groove 2108*a*'. In the illustrated embodiment of the present disclosure, the first groove 2108*b*' is an arc-shaped groove which is recessed in a direction away from the second groove 2108*c*'. The second groove 2108***c*' is an arc groove which is recessed in a direction away from the first groove 2108*b*'. The main groove 2108*a*' includes a first arc-shaped surface 2108*a*1', a second arc-shaped surface 2108*a*2', a third arc-shaped surface 2108*a*3' and a fourth arc-shaped surface 2108*a*4' which are located at four corners thereof. The first groove 2108*b*' is located in the middle of the first arc-shaped surface 2108*a*1' and the third arc-shaped surface 2108*a*3'; and the second groove 2108*c*' is located in the middle of the second arc-shaped surface 2108*a*2' and the fourth arc-shaped surface 2108*a*4', so as to maintain the symmetry of the receiving groove 2108'. In the illustrated embodiment of the present disclosure, both the first groove 2108*b*' and the second groove 2108*c*' extend upwardly through the top surface 2101'. However, neither the first groove 2108*b*' nor the second groove 2108*c*' extends downwardly through the bottom surface 2102'. The base 210' includes a first support surface 2108*b*1' at a bottom of the first groove 2108*b*' and a second support surface 2108*c*1' located at a bottom of the second groove 2108*c*'.

Referring to FIG. 34, the first side wall portion 211' includes a first top surface 2111', a first inner side surface 2112', a plurality of first protrusions 2113' protruding inwardly from the first inner side surface 2112' into the receiving space 213', and a plurality of first positioning groove 2114' each of which is located between two adjacent first protrusions 2113'. In the illustrated embodiment of the present disclosure, the first positioning groove 2114' is a dovetail groove. The first positioning groove 2114' has two oppositely arranged inclined surfaces, thereby making the width of the first positioning groove 2114' close to the first inner side surface 2112' be larger than the width of the first positioning groove 2114' away from the first inner side surface 2112'. In addition, the first top surface 2111' has a first guiding inclined surface 2111*a*' inclined toward the receiving space 213' and a notch 2111*b*' extending upwardly through the first top surface 2111'. The notch 2111*b*' can serve an identification function to prevent the first backplane connector 100 from being inserted at a wrong angle. The first guiding inclined surface 2111*a*' further extends to the top of the plurality of first protrusions 2113'.

Referring to FIG. 35, the second side wall portion 212' includes a second top surface 2121', a second inner side surface 2122', a plurality of second protrusions 2123' protruding inwardly from the second inner side surface 2122' into the receiving space 213', and a plurality of second positioning grooves 2124' each of which is located between two adjacent second protrusions 2123'. In the illustrated embodiment of the present disclosure, the second positioning groove 2124' is a dovetail groove. The second positioning groove 2124' has two opposite inclined surfaces, thereby making the width of the second positioning groove 2124' close to the second inner side surface 2122' be larger than the width of the second positioning groove 2124' away from the second inner side surface 2122'. In addition, the second top surface 2121' has a second guiding inclined surface 2121*a*' which is inclined toward the receiving space 213'. The second guiding inclined surface 2121*a*' further extends to the top of the plurality of second protrusions 2123'. The first guiding inclined surface 2111*a*' and the second guiding inclined surface 2121*a*' are used to guide the first backplane connector 100 to be inserted into the receiving space 213'. In the illustrated embodiment of the present disclosure, the first protrusions 2113' and the second protrusions 2123' are symmetrically disposed on opposite sides of the housing 21'. The first positioning grooves 2114' and the second positioning grooves 2124' are also symmetrically disposed on opposite sides of the housing 21'.

Figure 40:
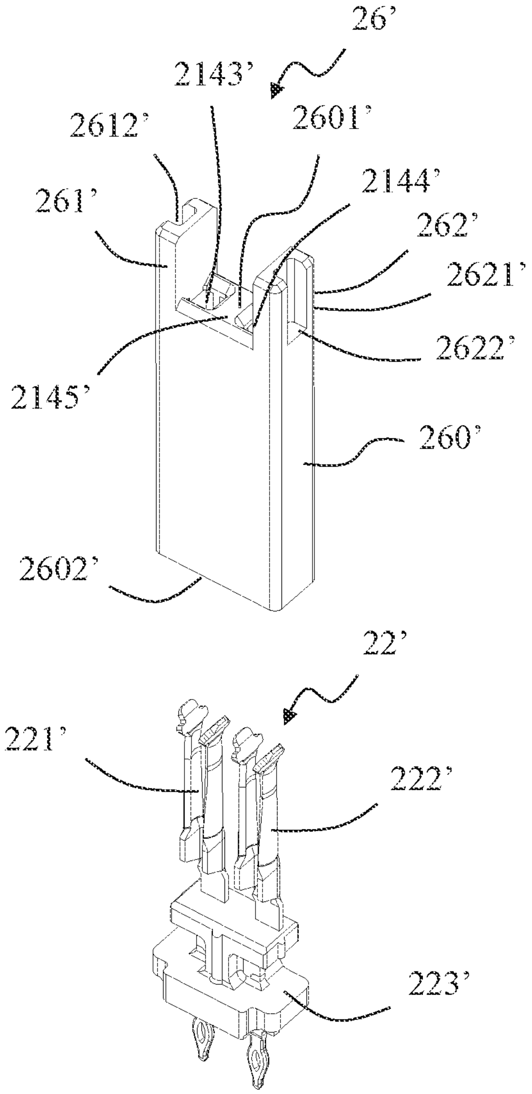
FIG. 40 is a perspective exploded view of an insulating body and the terminal module in FIG. 38.
Figure 41:
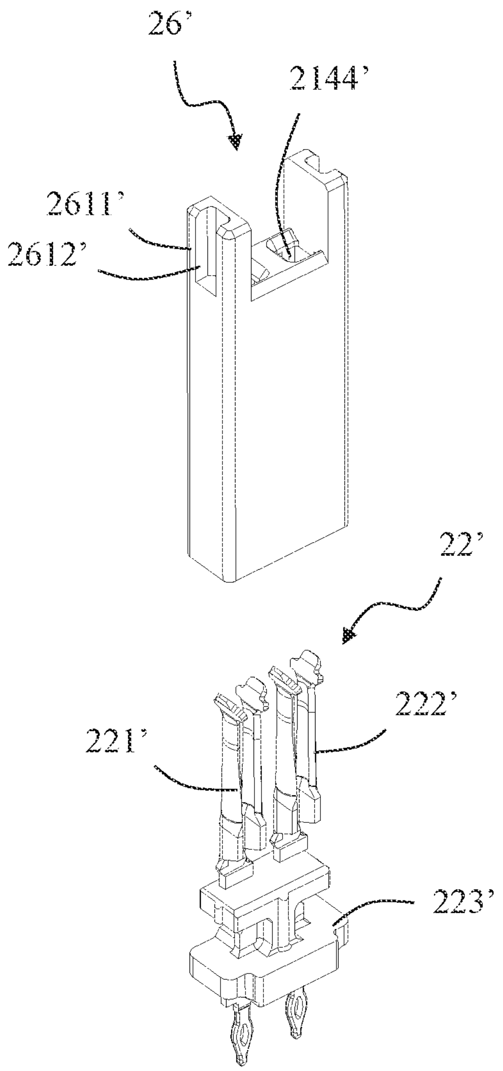
FIG. 41 is a perspective exploded view of FIG. 40 from another angle.
Figure 42:
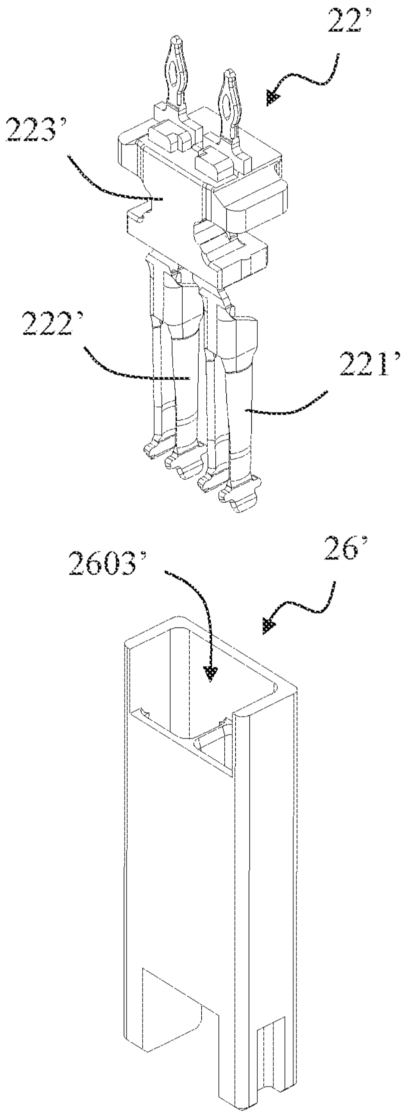
FIG. 42 is a perspective exploded view of FIG. 40 from yet another angle.

Referring to FIG. 40 to FIG. 42, the insulating body 26' includes a base portion 260', a first extension block 261' extending upwardly from one side of the base portion 260', and a second extension block 262' extending upwardly from the other side of the base portion 260'. The base portion 260' includes an upper surface 2601', a lower surface 2602', at least one terminal receiving hole extending upwardly through the upper surface 2601', and an accommodating space 2603' extending downwardly through the lower surface 2602'. In the illustrated embodiment of the present disclosure, the at least one terminal receiving hole includes a first terminal receiving hole 2143' and a second terminal receiving hole 2144' arranged in parallel. Both the first terminal receiving hole 2143' and the second terminal receiving hole 2144' are square holes. The base portion 260' is further provided with a partition portion 2145' for separating the first terminal receiving hole 2143' from the second terminal receiving hole 2144'.

In the illustrated embodiment of the present disclosure, both the first extension block 261' and the second extension block 262' are integrally formed with the base portion 260'. The first extension block 261' includes an outer first side surface 2611' and a first positioning groove 2612' recessed inwardly from the first side surface 2611'. The second extension block 262' includes an outer second side surface 2621' and a second positioning groove 2622' recessed inwardly from the second side surface 2621'. In the illustrated embodiment of the present disclosure, the first positioning groove 2612' extends upwardly through the top surface of the first extension block 261'. The second positioning groove 2622' extends upwardly through the top surface of the second extension block 262'. In the illustrated embodiment of the present disclosure, the first positioning groove 2612' does not extend inwardly through the first extension block 261'. The second positioning groove 2622' does not extend inwardly through the second extension block 262'. As a result, on the one hand, such design helps to improve the structural strength of the insulating body 26'; on the other hand, it prevents the metal shield surrounding member 23' from extending from the first positioning groove 2612' and the second positioning groove 2622' into a space between the first extension block 261' and the second extension block 262', thereby reducing the risk of short circuit caused by the metal shield surrounding member 23' being in contact with the signal terminals.

Figure 43:
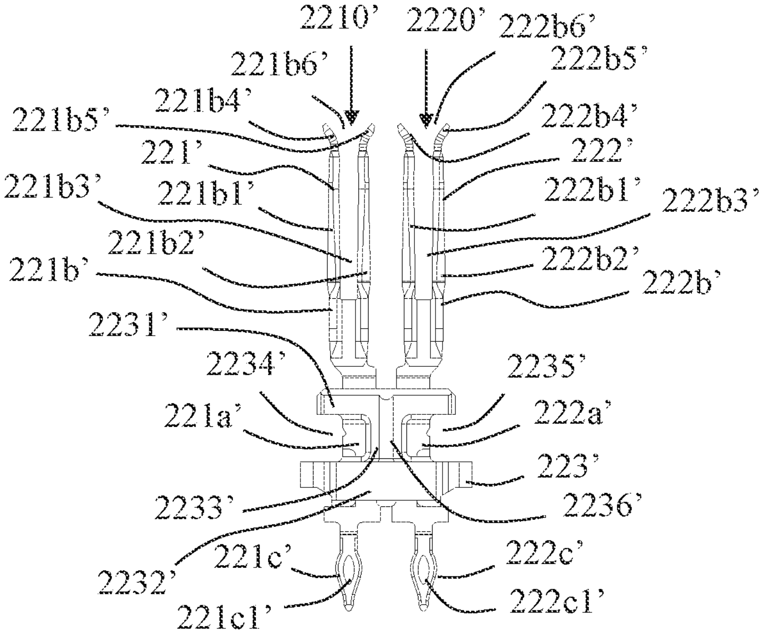
FIG. 43 is a front view of the terminal module in FIG. 40.
Figure 44:
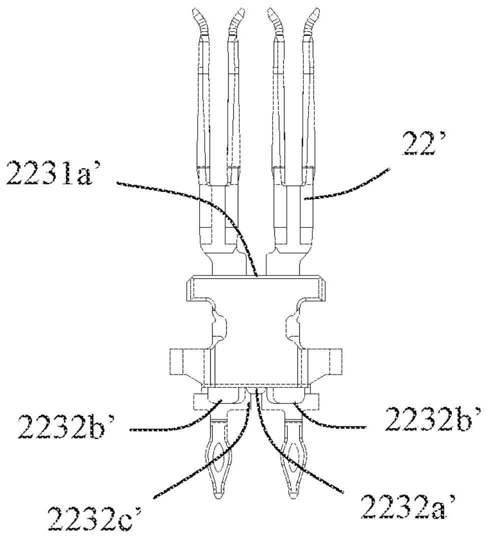
FIG. 44 is a rear view of FIG. 43.
Figure 45:
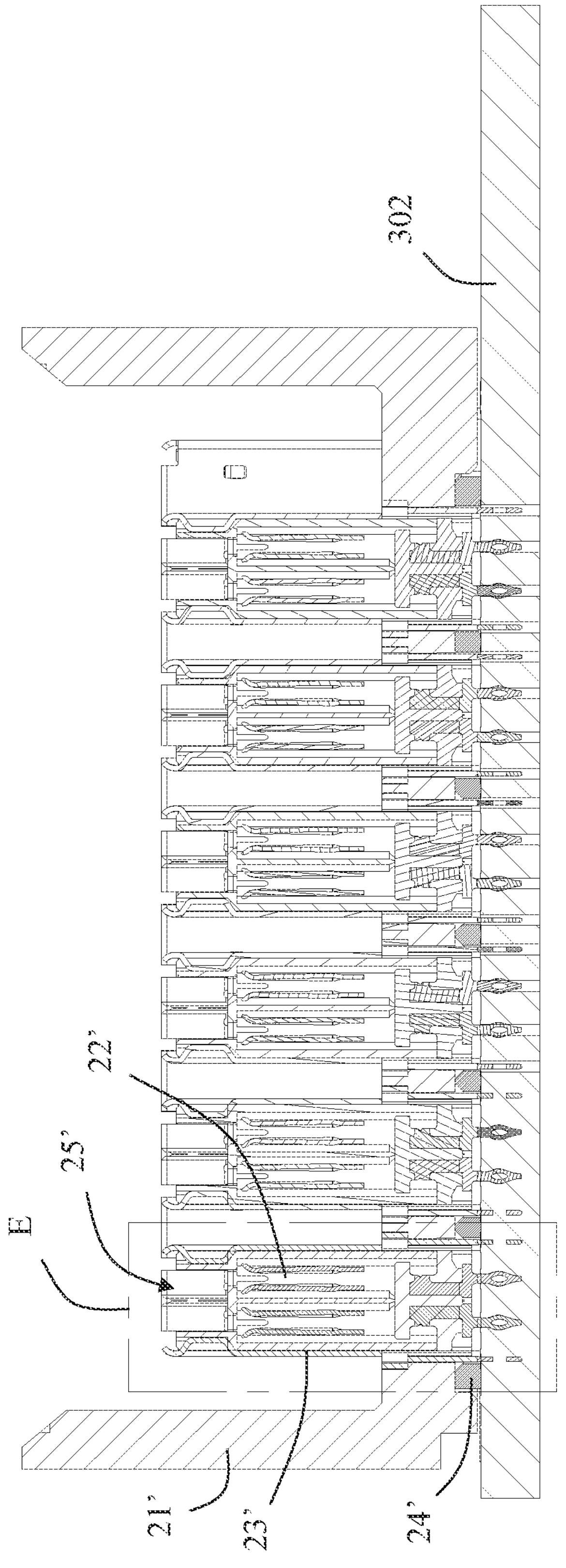
FIG. 45 is a schematic cross-sectional view taken along line D-D in FIG. 27.

Referring to FIG. 43 and FIG. 44, each terminal module 22' includes a first signal terminal 221', a second signal terminal 222', and an insulating block 223' fixed to the first signal terminal 221' and the second signal terminal 222'. In an embodiment of the present disclosure, the first signal terminal 221' and the second signal terminal 222' are insert-molded with the insulating block 223'. In an embodiment of the present disclosure, the first signal terminal 221' and the second signal terminal 222' form a pair of differential signal terminals. In the illustrated embodiment of the present disclosure, the first signal terminal 221' and the second signal terminal 222' are symmetrically arranged along a central axis of the insulating block 223'.

The first signal terminal 221' includes a first fixing portion 221*a*' fixed to the insulating block 223', a first contact portion 221*b*' extending upwardly from the first fixing portion 221*a*', and a first mounting foot 221*c*' extending downwardly from the first fixing portion 221*a*'. The first mounting foot 221*c*' has a first fisheye hole 221*c*1' so that the first mounting foot 221*c*' has a certain elasticity. As a result, it facilitates pressing the first mounting tool 221*c*' into the conductive hole of the second circuit board 302 so as to achieve electrical conduction. The first contact portion 221*b*' has a two-half structure and includes a first contact piece 221*b*1', a second contact piece 221*b*2', and a first insertion hole 2210' located between the first contact piece 221*b*1' and the second contact piece 221*b*2'. The first contact piece 221*b*1' and the second contact piece 2202' are separated by two first slots 2211*b*', so that the first contact portion 221*b*' has better elasticity, thereby improving the reliability of mating with the conductive terminals of a mating connector. In addition, the first contact piece 221*b*1' also includes a first flared portion 221*b*4' at its end. The second contact piece 221*b*2' also includes a second flared portion 221*b*5' at its end. The first flared portion 2211*b*4' and the second flared portion 221*b*5' form a first bell mouth 2211*b*6' communicating with the first insertion hole 2210' in order to guide the insertion of the conductive terminal of the mating connector.

The second signal terminal 222' includes a second fixing portion 222*a*' fixed to the insulating block 223', a second contact portion 222*b*' extending upwardly from the second fixing portion 222*a*', and a second mounting foot 222*c*' extending downwardly from the second fixing portion 222*a*'. The second mounting foot 222*c*' has a second fisheye hole 222*c*1' so that the second mounting foot 222*c*' has a certain elasticity. As a result, it facilitates pressing the second mounting foot 222*c*' into the conductive hole of the second circuit board 302 so as to achieve electrical conduction. The second contact portion 222*b*' has a two-half structure and includes a third contact piece 222*b*', a fourth contact piece 222*b*2', and a second insertion hole 2220' located between the third contact piece 222*b*1' and the fourth contact piece 222*b*2'. The third contact piece 222*b*1' and the fourth contact piece 222*b*2' are separated by two second slots 222*b*3', so that the second contact portion 222*b*' has better elasticity, thereby improving the reliability of mating with the conductive terminals of a mating connector. In addition, the third contact piece 222*b*1' also includes a third flared portion 222*b*4' at its end. The fourth contact piece 222*b*2' also includes a fourth flared portion 222*b*5' at its end. The third flared portion 222*b*4' and the fourth flared portion 222*b*5' form a second bell mouth 222*b*6' communicating with the second insertion hole 2220' in order to guide the insertion of the conductive terminal of the mating connector.

In the illustrated embodiment of the present disclosure, the insulating block 223' includes a top portion 2231', a bottom portion 2232', and a connection portion 2233' connecting the top portion 2231' and the bottom portion 2232'. The top portion 2231' is parallel to the bottom portion 2232'. The connection portion 2233' is perpendicular to the top portion 2231' and the bottom portion 2232'. An upper end and a lower end of the connection portion 2233' is connected to a middle of the top portion 2231' and a middle of the bottom portion 2232', respectively. The top portion 223 has a top surface 2231*a*'. The length of the top portion 2231' is shorter than the length of the bottom portion 2232'. The insulating block 223' also includes a first opening 2234' and a second opening 2235' located between the top portion 2231' and the bottom portion 2232'. The first opening 2234' and the second opening 2235' are respectively located on both sides of the connection portion 2233'. The first fixing portion 221*a*' of the first signal terminal 221' is partially exposed in the first opening 2234', and the second fixing portion 222*a*' of the second signal terminal 222' is partially exposed in the second opening 2235' for adjusting impedance. The bottom portion 2232' includes a bottom surface 2232*a*', two protrusions 2232*b*' protruding downwardly from the bottom surface 2232*a*', and a positioning groove 2232*c*' located between the two protrusions 2232*b*'. The two protrusions 2232*b*' respectively abut against the bottom end of the first fixing portion 221*a*' and the bottom end of the second fixing portion 222*a*'. The outer peripheral surface of the insulating block 223' also includes a plurality of ribs 2236'. The outer surface of the rib 2236' is in the shape of a semicircular arc. In the illustrated embodiment of the present disclosure, the rib 2236' is located in the middle position of the two sides of the top portion 2231' and in the middle position of the front end surface of the connection portion 2233'. Of course, in other embodiments, the ribs 2236' can also be arranged on both sides of the bottom portion 2232' and/or the front end surface of the bottom portion 2232'. The rib 2236' is used to abut against the insulating body 26' in order to improve the reliability of installation.

Figure 38:
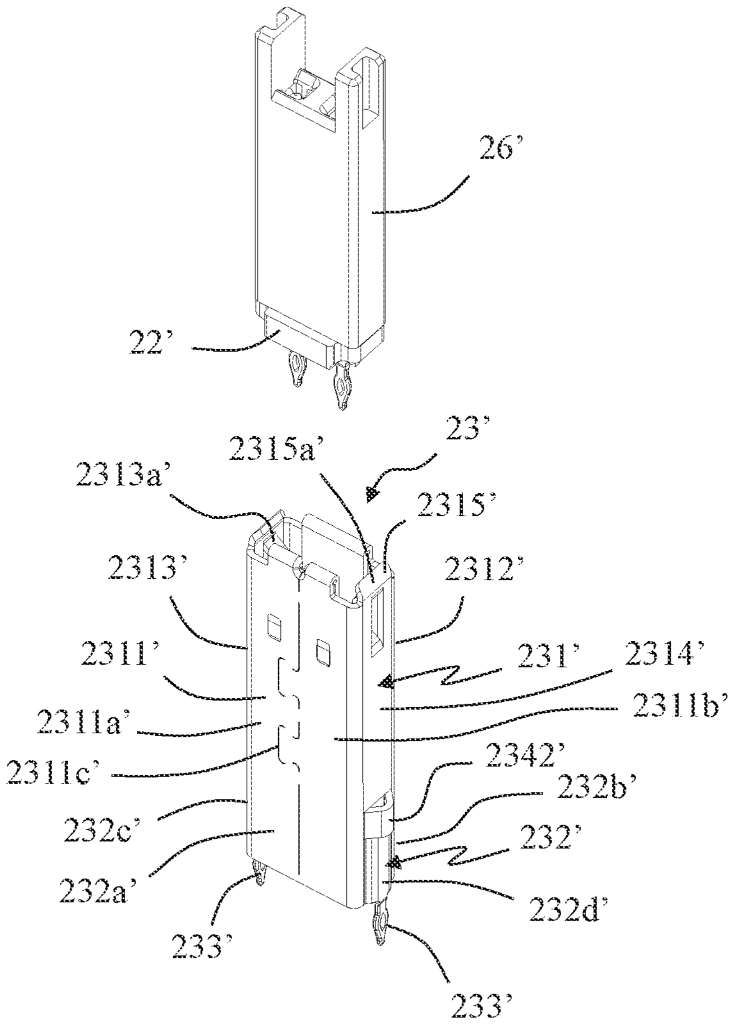
FIG. 38 is a partial perspective exploded view of a terminal module in FIG. 34.
Figure 39:
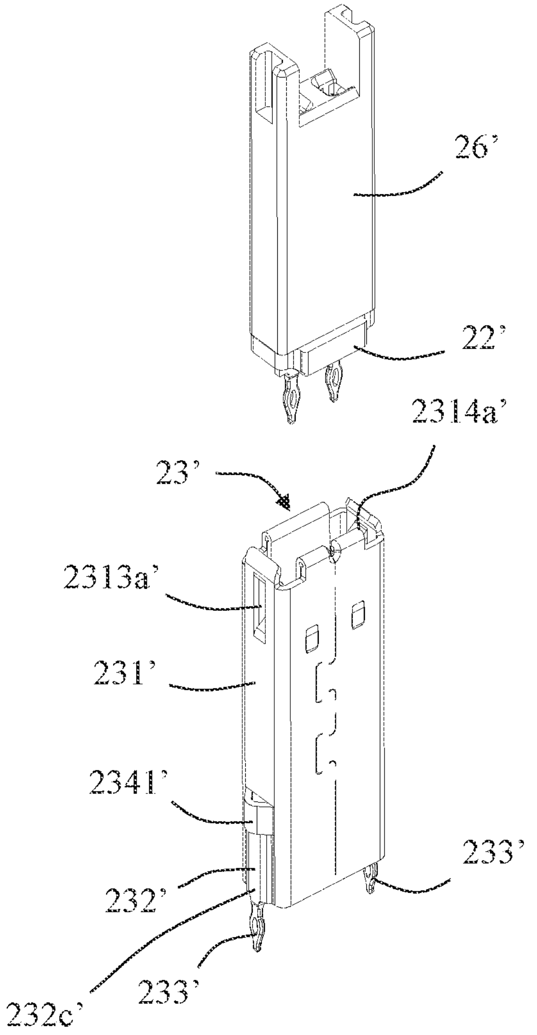
FIG. 39 is a partial perspective exploded view of FIG. 38 from another angle.
Figure 46:
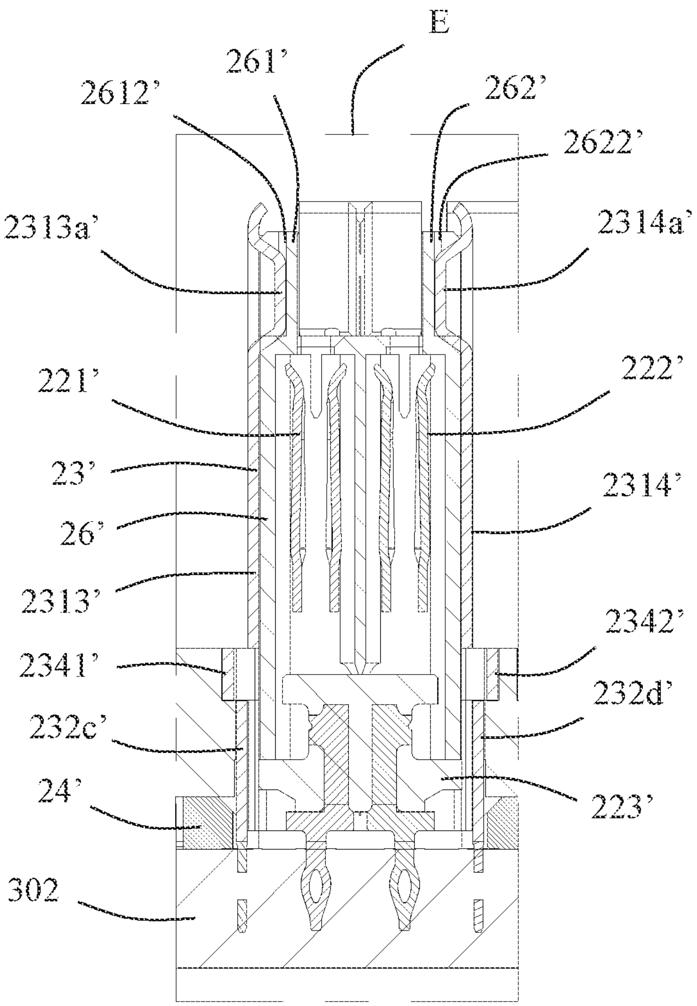
FIG. 46 is a partial enlarged view of a frame part E in FIG. 45.

Referring to FIG. 38, FIG. 39 and FIG. 46, in the illustrated embodiment of the present disclosure, the metal shield surrounding member 23' is formed by stamping, bending and riveting a metal plate. The metal shield surrounding member 23' includes a surrounding portion 231', a mounting portion 232' extending downwardly from the surrounding portion 231', a plurality of mounting feet 233' extending downwardly from the mounting portion 232', and a positioning protrusion located between the surrounding portion 231' and the mounting portion 232'. The surrounding portion 231' includes a first side wall 2311', a second side wall 2312', a third side wall 2313' and a fourth side wall 2314'. The first side wall 2311' is opposite to the third side wall 2313', and the second side wall 2312' is opposite to the fourth side wall 2314', thereby forming a fully-enclosed shielding cavity. In the illustrated embodiment of the present disclosure, areas of the first side wall 2311' and the third side wall 2313' are larger than areas of the second side wall 2312' and the fourth side wall 2314'. Each end of the first side wall 2311', the second side wall 2312', the third side wall 2313' and the burh side wall 2314' includes a deflection portion 2315' which is bent inwardly. The deflection portions 2315' are independent from one another so that they can be bent independently in order to avoid mutual interference. Each deflection portion 2315' has a guiding portion 2315*a*' on its outer surface. By providing the deflection portions 2315', a constricted opening can be formed at the end of the metal shield surrounding member 23'. The guiding portion 2315*a*' can guide the deflection portions 2315' from being easily inserted into the first backplane connector 100. In the illustrated embodiment of the present disclosure, the first side wall 2311' includes a first wall portion 2311*a*' and a second wall portion 2311*b*'. The first wall portion 2311*a*' and the second wall portion 2311*b*' are fixed together by riveting. A riveting line 2311*c*' is formed at a junction of the first wall portion 2311*a*' and the second wall portion 2311*b*'. In other embodiments of the present disclosure, it is also possible that only the ends of at least three of the first side wall 2311', the second side wall 2312', the third side wall 2313' and the fourth side wall 2314' which are connected to each other, are provided with the deflection portions 2315' bent inwardly. For example, the deflection portions 2315' bent inwardly are provided at the ends of the second side wall 2312', the third side wall 2313' and the fourth side wall 2314' which are sequentially connected.

In the illustrated embodiment of the present disclosure, the mounting portion 232' includes a fifth side wall 232*a*', a sixth side wall 232*b*', a seventh side wall 232*c*' and an eighth side wall 232*d*'. The fifth side wall 232*a*' is opposite to the seventh side wall 232*c*', and the sixth side wall 232*b*' is opposite to the eighth side wall 232*d*', so as to form a fully-enclosed shielding cavity. In the illustrated embodiment of the present disclosure, an area of each of the fifth side wall 232*a*' and the seventh side wall 232*c*' is larger than an area of each of the sixth side wall 232*b*' and the eighth side wall 232*d*'.

The fifth side wall 232*a*' and the first side wall 2311' are located on a same side of the metal shield surrounding member 23'. The sixth side wall 232*b*' and the second side wall 2312' are located on a same side of the metal shield surrounding member 23'. The seventh side wall 232*c*' and the third side wall 2313' are located on a same side of the metal shield surrounding member 23'. The eighth side wall 232*d*' and the fourth side wall 2314' are located on a same side of the metal shield surrounding member 23'.

In the illustrated embodiment of the present disclosure, the fifth side wall 232*a*' is located in a same plane as the first side wall 2311', that is, the fifth side wall 232*a*' is flush with the first side wall 2311'. The sixth side wall 232*b*' is located in a same plane as the second side wall 2312', that is, the sixth side wall 232*b*' is flush with the second side wall 2312'. As shown in FIG. 46, the seventh side wall 232*c*' protrudes beyond the third side wall 2313'. The eighth side wall 232*d*' protrudes beyond the fourth side wall 2314'. The positioning protrusion includes a first positioning protrusion 2341' located between the seventh side wall 232*c*' and the third side wall 2313', and a second positioning protrusion 2342' located between the eighth side wall 232*d*' and the fourth side wall 2314'. The first positioning protrusion 2341' is arc-shaped and protrudes beyond the seventh side wall 232*c*' and the third side wall 2313'. The second positioning protrusion 2342' is arc-shaped and protrudes beyond the eighth side wall 232*d*' and the fourth side wall 2314'.

In the illustrated embodiment of the present disclosure, the third side wall 2313' further includes a first protruding tab 2313*a*' punched inwardly and locked in the first positioning groove 2612'. The fourth side wall 2314' further includes a second protruding tab 2314*a*' punched inwardly and locked in the second positioning groove 2622'.

The plurality of mounting feet 233' integrally extend downwardly from the seventh side wall 232*c*' and the eighth side wall 232*d*', respectively.

Referring to FIG. 35, the mounting block 24' includes a plurality of mounting bars 241' arranged in a staggered manner and connected as a whole. Each mounting bar 241' includes a positioning slot 242' for positioning the mounting portion 232'.

When assembling, the terminal module 22' and the insulating body 26' are assembled together firstly. The insulating block 223' is at least partially accommodated in the accommodating space 2603'. Then, the metal shield surrounding member 23' is sleeved on the insulating body 26' so as to form the mounting module 25'. Then, the mounting module 25' are assembled in a corresponding receiving groove 2108' of the housing 21' from top to bottom. The mounting portion 232' is locked in the main groove 2108*a*'. The four arc-shaped corners of the mounting portion 232' correspond to the first arc-shaped surface 2108*a*1', the second arc-shaped surface 2108*a*2', the third arc-shaped surface 2108*a*3' and the fourth arc-shaped surface 2108*a*4', so as to balance the force distribution and avoid installation inclination. The first positioning protrusion 2341' and the second positioning protrusion 2342' are locked in the first groove 2108*b*' and the second groove 2108*c*', respectively. The first positioning protrusion 2341' and the second positioning protrusion 2342' abut against the first support surface 2108*b*1' and the second support surface 2108*c*1 respectively, so as to function as positioning and limiting. Finally, the mounting block 24' is installed in the receiving groove 2100' from bottom to top, so as to fix the mouthing portion 232' of the metal shield surrounding member 23'. At this time, the mounting feet 233' of the metal shield surrounding member 23', the first mounting foot 221*c*' of the first signal terminal 221', and the second mounting foot 222*c*' of the second signal terminal 222' pass through the mounting block 24' to be electrically connected to the second circuit board 302.

When the first backplane connector 100 is mated with the second backplane connector 200', the first housing 1 of the first backplane connector 100 is inserted into the receiving space 213' of the housing 21' of the second backplane connector 200'. The surrounding portions 231' of the terminal modules 22' of the second backplane connector 200' are inserted into the first terminal modules 2 of the first backplane connector TOO under the guidance of the deflection portions 2315'.

Compared with the prior art, the metal shield surrounding member 23' of the present disclosure includes a surrounding portion 231' and a mounting portion 232' extending downwardly from the surrounding portion 231'. Both the surrounding portion 231' and the mounting portion 232' are formed by four side walls so as to form a fully-enclosed shielding cavity, thereby improving the shielding effect. In addition, the fifth side wall 232*a*' is connected to the first side wall 2311' and is located on the same side of the metal shield surrounding member 23'. The sixth side wall 232*b*' is connected to the second side wall 2312' and is located on the same side of the metal shield surrounding member 23'. The seventh side wall 232*c*' is connected to the third side wall 2313' and is located on the same side of the metal shield surrounding member 23'. The eighth side wall 232*d*' is connected to the fourth side wall 2314' and is located on the same side of the metal shield surrounding member 23'. In this way, the fifth side wall 232*a*' and the first side wall 2311' are able to form a grounding return; the sixth side wall 232*b*' and the second side wall 2312' are able to form a grounding return; the seventh side wall 232*c*' and the third side wall 2313' are able to form a grounding return; and the eighth side wall 232*d*' and the fourth side wall 2314' are able to form a grounding return; thereby improving the effect of the grounding return.

The above embodiments are only used to illustrate the present disclosure and not to limit the technical solutions described in the present disclosure. The understanding of this specification should be based on those skilled in the art. Descriptions of directions, such as "front", "rear", "left", "right", "top" and "bottom", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A backplane connector, comprising:

a housing comprising a base, a first side wall portion extending from one end of the base, and a second side wall portion extending from another end of the base; the base, the first side wall portion and the second side wall portion jointly forming a receiving space for at least partially receiving a mating connector;

a plurality of insulating protrusions protruding into the receiving space;

a plurality of terminal modules, each terminal module being assembled to a corresponding insulating protrusion; and a plurality of metal shield surrounding members, each metal shield surrounding member being sleeved on the corresponding insulating protrusion;

wherein the metal shield surrounding member comprises a surrounding portion and a mounting portion extending downwardly from the surrounding portion; the surrounding portion comprises a first side wall, a second side wall, a third side wall and a fourth side wall; the first side wall is disposed opposite to the third side wall, the second side wall is disposed opposite to the fourth side wall; the first side wall, the second side wall, the third side wall and the fourth side wall are enclosed to form a fully-enclosed shielding cavity;

the mounting portion comprises a sixth side wall, a seventh side wall and an eighth side wall; the sixth side wall is connected to the second side wall and is located on a same side of the metal shield surrounding member; the seventh side wall is connected to the third side wall and is located on a same side of the metal shield surrounding member; the eighth side wall is connected to the fourth side wall and is located on a same side of the metal shield surrounding member; and the seventh side wall protrudes outwardly beyond the third side wall along a direction away from the third side wall; and the eighth side wall protrudes outwardly beyond the fourth side wall along a direction away from the fourth side wall.

2. The backplane connector according to claim 1, wherein the sixth side wall is flush with the second side wall.

3. The backplane connector according to claim 1, wherein each of the first side wall, the second side wall, the third side wall and the fourth side wall comprises a deflection portion which is bent inwardly to guide insertion of the mating connector.

4. The backplane connector according to claim 1, wherein the mounting portion comprises a fifth side wall, the fifth side wall, the sixth side wall, the seventh side wall and the eighth side wall are enclosed to form another fully-enclosed shielding cavity.

5. The backplane connector according to claim 4, wherein the fifth side wall is connected to the first side wall and is located on a same side of the metal shield surrounding member; and the fifth side wall is flush with the first side wall.

6. The backplane connector according to claim 4, wherein the metal shield surrounding member comprises a first positioning protrusion located between the seventh side wall and the third side wall, and a second positioning protrusion located between the eighth side wall and the fourth side wall;

the receiving groove comprises a main groove located in the middle, a first groove located on one side of the main groove, and a second groove located on another side of the main groove; the mounting portion is fixed in the main groove; the first positioning protrusion is fixed in the first groove; the second positioning protrusion is fixed in the second groove.

7. The backplane connector according to claim 6, wherein the first groove is an arc-shaped groove and is recessed in a direction away from the second groove; the second groove is an arc-shaped groove and is recessed in a direction away from the first groove; the base comprises a first support surface located at a bottom of the first groove, and a second support surface located at a bottom of the second groove;

the first positioning protrusion abuts against the first support surface; the second positioning protrusion abuts against the second support surface.

8. The backplane connector according to claim 6, wherein the main groove comprises a first arc-shaped surface, a second arc-shaped surface, a third arc-shaped surface and a fourth arc-shaped surface which are located at four corners of the main groove; the first groove is located in a middle of the first arc-shaped surface and the third arc-shaped surface; and the second groove is located in a middle of the second arc-shaped surface and the fourth arc-shaped surface.

9. The backplane connector according to claim 1, wherein each terminal module comprises a first signal terminal, a second signal terminal, and an insulating block to which the first signal terminal and the second signal terminal are fixed;

the insulating protrusion comprises a base portion, a first extension block extending upwardly from one side of the base portion, and a second extension block extending upwardly from another side of the base portion; the base portion defines a first terminal receiving hole and a second terminal receiving hole; the first signal terminal and the second signal terminal are accommodated in the first terminal receiving hole and the second terminal receiving hole, respectively;

the first extension block comprises a first side surface and a first positioning groove recessed inwardly from the first side surface; the second extension block comprises a second side surface and a second positioning groove recessed inwardly from the second side surface;

the third side wall comprises a first protruding tab protruding inwardly to be locked in the first positioning groove; the fourth side wall comprises a second protruding tab protruding inward to be locked in the second positioning groove.

10. The backplane connector according to claim 9, wherein the first positioning groove does not extend inwardly through the first extension block; and the second positioning groove does not extend inwardly through the second extension block.

11. A backplane connector, comprising:

a housing comprising a base, a first side wall portion extending upwardly from one end of the base, and a second side wall portion extending upwardly from another end of the base; the base, the first side wall portion and the second side wall portion jointly forming a receiving space for at least partially receiving a mating connector; the base defining a plurality of receiving grooves extending through the base; and a plurality of mounting modules assembled to the receiving grooves; each mounting module comprising an insulating body, a terminal module installed in the insulating body, and a metal shield surrounding member sleeved on the insulating body;

wherein the metal shield surrounding member comprises a surrounding portion and a mounting portion extending downwardly from the surrounding portion; the surrounding portion comprises a first side wall, a second side wall, a third side wall and a fourth side wall; the first side wall is disposed opposite to the third side wall; the second side wall is disposed opposite to the fourth side wall; the first side wall, the second side wall, the third side wall and the fourth side wall are enclosed to form a fully-enclosed shielding cavity;

the mounting portion comprises a fifth side wall, a sixth side wall, a seventh side wall and an eighth side wall; the fifth side wall is disposed opposite to the seventh side wall; the sixth side wall is disposed opposite to the eighth side wall; the fifth side wall, the sixth side wall, the seventh side wall and the eighth side wall are enclosed to form another fully-enclosed shielding cavity;

the fifth side wall is connected to the first side wall and is located on a same side of the metal shield surrounding member; the sixth side wall is connected to the second side wall and is located on a same side of the metal shield surrounding member; the seventh side wall is connected to the third side wall and is located on a same side of the metal shield surrounding member; the eighth side wall is connected to the fourth side wall and is located on a same side of the metal shield surrounding member; and the mounting portion is fixed in a corresponding receiving groove.

12. The backplane connector according to claim 11, wherein the seventh side wall protrudes outwardly beyond the third side wall; and the eighth side wall protrudes outwardly beyond the fourth side wall.

13. The backplane connector according to claim 12, wherein the fifth side wall is flush with the first side wall; and the sixth side wall is flush with the second side wall.

14. The backplane connector according to claim 12, wherein the metal shield surrounding member comprises a first positioning protrusion located between the seventh side wall and the third side wall, and a second positioning protrusion located between the eighth side wall and the fourth side wall;

the receiving groove comprises a main groove located in the middle, a first groove located on one side of the main groove, and a second groove located on another side of the main groove; the mounting portion is fixed in the main groove; the first positioning protrusion is fixed in the first groove; the second positioning protrusion is fixed in the second groove.

15. The backplane connector according to claim 14, wherein the first groove is an arc-shaped groove and is recessed in a direction away from the second groove; the second groove is an arc-shaped groove and is recessed in a direction away from the first groove; the base comprises a first support surface located at a bottom of the first groove, and a second support surface located at a bottom of the second groove;

the first positioning protrusion abuts against the first support surface; the second positioning protrusion abuts against the second support surface.

16. The backplane connector according to claim 14, wherein the main groove comprises a first arc-shaped surface, a second arc-shaped surface, a third arc-shaped surface and a fourth arc-shaped surface which are located at four corners of the main groove; the first groove is located in a middle of the first arc-shaped surface and the third arc-shaped surface; and the second groove is located in a middle of the second arc-shaped surface and the fourth arc-shaped surface.

17. The backplane connector according to claim 11, wherein the metal shield surrounding member further comprises a plurality of mounting feet extending from the mounting portion; the backplane connector further comprises a mounting block mounted to a bottom of the housing; the mounting block defines a positioning slot to position the mounting portion; the plurality of mounting feet pass through the mounting block.

18. The backplane connector according to claim 11, wherein the terminal module comprises a first signal terminal, a second signal terminal, and an insulating block to which the first signal terminal and the second signal terminal are fixed;

the insulating body comprises a base portion, a first extension block extending upwardly from one side of the base portion; and a second extension block extending upwardly from another side of the base portion; the base portion defines a first terminal receiving hole and a second terminal receiving hole; the first signal terminal and the second signal terminal are accommodated in the first terminal receiving hole and the second terminal receiving hole, respectively;

the first extension block comprises a first side surface and a first positioning groove recessed inwardly from the first side surface; the second extension block comprises a second side surface and a second positioning groove recessed inwardly from the second side surface;

the third side wall comprises a first protruding tab protruding inwardly to be locked in the first positioning groove; the fourth side wall comprises a second protruding tab protruding inward to be locked in the second positioning groove.

19. The backplane connector according to claim 18, wherein the first positioning groove does not extend inwardly through the first extension block; and the second positioning groove does not extend inwardly through the second extension block.

20. The backplane connector according to claim 18, wherein the first positioning groove extends upwardly through a top surface of the first extension block; and the second positioning groove extends upwardly through a top surface of the second extension block.

* * * * *